United States Patent
Noboa et al.

(10) Patent No.: US 10,402,767 B2
(45) Date of Patent: Sep. 3, 2019

(54) SYSTEMS AND METHODS FOR MONETIZING AND PRIORITIZING BUILDING FAULTS

(71) Applicant: Johnson Controls Technology Company, Holland, MI (US)

(72) Inventors: Homero L. Noboa, Waukesha, WI (US); Mohammad N. ElBsat, Milwaukee, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 1418 days.

(21) Appl. No.: 14/179,672

(22) Filed: Feb. 13, 2014

(65) Prior Publication Data
US 2015/0227870 A1    Aug. 13, 2015

(51) Int. Cl.
*G06Q 10/06* (2012.01)

(52) U.S. Cl.
CPC ............... *G06Q 10/0635* (2013.01)

(58) Field of Classification Search
CPC .................................... G06Q 10/0635
See application file for complete search history.

(56) References Cited

U.S. PATENT DOCUMENTS

| | | | |
|---|---|---|---|
| 8,150,720 B2 * | 4/2012 | Singh | G05B 23/0283 700/103 |
| 8,239,168 B2 | 8/2012 | House et al. | |
| 8,532,808 B2 | 9/2013 | Drees et al. | |
| 2003/0115163 A1 * | 6/2003 | Moore | G06Q 30/0283 705/500 |
| 2011/0130886 A1 | 6/2011 | Drees et al. | |
| 2011/0257911 A1 | 10/2011 | Drees et al. | |
| 2012/0022700 A1 * | 1/2012 | Drees | G05B 15/02 700/276 |
| 2012/0084063 A1 | 4/2012 | Drees et al. | |

(Continued)

FOREIGN PATENT DOCUMENTS

WO    WO-2011/100255 A2    8/2011

OTHER PUBLICATIONS

Wikipedia, "Control variable," www.wikipedia.org, version of article dated Feb. 8, 2013.*

(Continued)

*Primary Examiner* — Nathan Erb
(74) *Attorney, Agent, or Firm* — Foley & Lardner LLP

(57) ABSTRACT

A fault parameter of an energy consumption model is modulated. The energy consumption model is used to estimate an amount of energy consumption at various values of the fault parameter. A first set of variables is generated including differences between a target value of the fault parameter and the various values of the fault parameter. A second set of variables is generated including differences between an estimated amount of energy consumption with the fault parameter at the target value and the estimated amounts of energy consumption with the fault parameter at the various values. The first set of variables and second set of variables are used to develop a regression model for the fault parameter. The regression model estimates a change in energy consumption based on a change in the fault parameter. Regression models are developed for multiple fault parameters and used to prioritize faults.

21 Claims, 8 Drawing Sheets

(56) References Cited

U.S. PATENT DOCUMENTS

| | | | |
|---|---|---|---|
| 2012/0259583 A1 | 10/2012 | Noboa et al. | |
| 2012/0278051 A1* | 11/2012 | Jiang | G06Q 10/04 703/2 |
| 2012/0297433 A1* | 11/2012 | Lindegren | H04N 21/23418 725/107 |
| 2013/0304269 A1* | 11/2013 | Shiel | G06Q 50/06 700/291 |
| 2013/0325377 A1 | 12/2013 | Drees et al. | |
| 2014/0095904 A1* | 4/2014 | Ananthakrishnan | G06F 1/3293 713/320 |

OTHER PUBLICATIONS

Lee, Seung Uk, Painter, Frank L., and Claridge, David E., "Whole-Building Commercial HVAC System Simulation for Use in Energy Consumption Fault Detection," ASHRAE Transactions, 113, 2007, pp. 52-61.*

* cited by examiner

Continuous Diagnostics Advisor

| Equipment with Faults | Chillers | Configure |

Equipment with Faults

Below is a listing of all your equipment with faults over a given time frame. Adjust the filters to narrow in on a particular element of interest.

Locations ▶ | Equipment Types ▶ | Fault Types ▶ | Peer Groups ▶ | Importance ▶ | Date Range ▶ | Saved Filters ▶

Equipment with Faults — Faults from Past Month

| Faults | Watched | Hidden |

| ★ | Location | Equipment | Fault(s) ▶ | Waste Expense | Savings Opportunity | Importance |
|---|---|---|---|---|---|---|
| □ ☆ ◉ | SJMMC Site Boiler House | Floor-1 VAV-65 | Supply Flow Effort: 38 | $1,000,000 | $12,000,000 | Low |
| □ ☆ ◉ | SJMMC Site Boiler House | Floor-1 VAV-39 | Zone Temperature Control Error: 38 | $1,000,000 | $12,000,000 | Low |
| □ ☆ ◉ | SJMMC Site Boiler House | Floor-1 VAV-4 | Supply Flow Effort: 38 | $1,000,000 | $12,000,000 | Low |
| □ ☆ ◉ | SJMMC Site Boiler House | Floor-1 VAV-29 | Total Faults: 37 Supply Flow Effort: 19 Supply Flow Error: 18 | $1,000,000 | $12,000,000 | Low |
| □ ☆ ◉ | SJMMC Site Boiler House | Floor-1 VAV-55 | Total Faults: 37 Supply Flow Effort: 19 Supply Flow Error: 18 | $1,000,000 | $12,000,000 | Low |
| □ ☆ ◉ | SJMMC Site Boiler House | Floor-1 VAV-22 | Supply Flow Error: 18 | $1,000,000 | $12,000,000 | Low |

FIG. 5

Continuous Diagnostics Advisor

| Equipment with Faults | Chillers | Configure |
|---|---|---|

Equipment with Faults

Below is a listing of all your equipment with faults over a given time frame. Adjust the filters to narrow in on a particular element of interest.

Locations ▶ | Equipment Types ▶ | Fault Types ▶ | Peer Groups ▶ | Importance ▶ | Date Range ▶ | Saved Filters ▶

Equipment with Faults — Faults from Yesterday

| | Location ◆ | Equipment ◆ | Importance ▶ | Fault(s) ◆ | Inefficiency Impact ◆ | Savings Opportunity |
|---|---|---|---|---|---|---|
| ★ ☐ ☆ 👁 | North Campus Corporate Building | AHU-cf | High | AHU-SD High Discharge Air Temperature: 1 | $120 | $14,000 |
| ☐ ☆ 👁 | North Campus Corporate Building Floor 5 | Fancoil-2 | Medium | Total Faults: 2 FCU Insufficient Heating Capacity: 1 FCU Low Zone Temperature: 1 | Minimal Impact | -- |
| ☐ ☆ 👁 | North Campus Corporate Building Floor 5 | VAV-808 | Medium | Total Faults: 2 VAV High Zone Temp: 1 VAV-SD No Flow Response: 1 | $30 | $1,000 |
| ☐ ☆ 👁 | North Campus Corporate Building Floor 5 | VAV-815 | Medium | Total Faults: 2 VAV-SD High Flow: 1 VAV-SD No Flow Response: 1 | $30 | $1,000 |
| ☐ ☆ 👁 | North Campus Corporate Building Floor 5 | VAV-820 Chilled | Medium | Total Faults: 3 VAV-SD Insuf. Flow Cap.: 1 VAV-SD Low Flow: 1 VAV-SD No Flow Response: 1 | $20 | $1,000 |

Faults | Watched | Hidden

FIG. 6

SYSTEMS AND METHODS FOR MONETIZING AND PRIORITIZING BUILDING FAULTS

BACKGROUND

A building management system (BMS) is, in general, hardware and/or software configured to control, monitor, and manage devices in or around a building or building area. BMS subsystems or devices can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof.

Fault detection is an element of some building management systems. Equipment faults can increase energy consumption, decrease equipment lifespans, and cause other undesirable effects in a building or building system. Many building management systems use fault detection to generate system alerts and drive diagnostic procedures.

Typical fault detection systems produce a list of potential faults. Correcting detected faults has the potential to reduce energy consumption as well as the financial cost that a building owner pays for energy. However, the building owner may be required to devote considerable human and economic resources to correct a detected fault. It is difficult and challenging to determine whether it would be cost effective to correct a detected fault and to determine a fault correction priority.

SUMMARY

One implementation of the present disclosure is a method for monetizing faults in a building. The method includes running, at a processing circuit, an energy consumption model for the building to estimate an amount of energy consumed by the building as a function of a plurality of parameters. In some embodiments, the energy consumption model is a simulation model (e.g., an EnergyPlus model). The method further includes modulating, by the processing circuit, a fault parameter of the energy consumption model and using the energy consumption model to estimate an amount of energy consumed by the building at multiple different values of the fault parameter. The method further includes generating, by the processing circuit, a first set of variables including multiple first differences in the fault parameter. Each of the first differences may correspond to a difference between a target value of the fault parameter and one of the multiple different values of the fault parameter. The method further includes generating, by the processing circuit, a second set of variables comprising multiple second differences in the amount of energy estimated by the energy consumption model. Each of the second differences may correspond to a difference between an amount of energy estimated by the energy consumption model with the fault parameter at the target value and one of the amounts of energy estimated by the energy consumption model with the fault parameter at one of the multiple different values. The method further includes using the first set of variables and the second set of variables to develop, by the processing circuit, a regression model for the fault parameter. The regression model may estimate a change in the amount of energy consumed by the building as a function of a change in the fault parameter. The method further includes determining, by the processing circuit, a cost of a fault associated with the fault parameter using the regression model.

In some embodiments, the method further includes repeating the 'running,' 'modulating,' 'generating,' and 'using' steps for a plurality of different fault parameters of the energy consumption model to develop a plurality of regression models. Each of the regression models may estimate a change in the amount of energy consumed by the building as a function of a change in a different fault parameter of the energy consumption model.

In some embodiments, the method further includes receiving multiple fault indications at the processing circuit. Each of the fault indications may correspond to a different fault parameter of the energy consumption model. The method may further include using multiple different regression models to determine a cost associated with each of the multiple fault indications. Each of the multiple different regression models may be developed for one of the different fault parameters of the energy consumption model. The method may further include prioritizing the multiple fault indications based on the cost associated with each of the multiple fault indications.

In some embodiments, determining the cost of the fault associated with the fault parameter using the regression model includes determining a difference between a current value of the fault parameter and the target value of the fault parameter, applying the difference between the current value of the fault parameter and the target value of the fault parameter as an input to the regression model developed for the fault parameter, and using the regression model to estimate a change in energy consumption resulting from the difference in the fault parameter.

In some embodiments, the method further includes determining a cost of correcting the fault, comparing the cost of the fault with the cost of correcting the fault, and displaying or storing an indication of whether it would be cost effective to correct the fault based on a result of the comparison.

In some embodiments, the method further includes displaying or storing a fault correction priority based at least partially on the cost of the fault. The fault correction priority may include at least one of a priority of correcting the fault relative to other faults, an indication of whether it would be cost effective to correct the fault, and an indication of whether the cost of the fault exceeds a cost threshold.

In some embodiments, the regression model estimates a cost of the fault per unit area. The method may further include identifying an area of the building affected by the fault and calculating an energy cost of the fault by multiplying the estimated energy cost per unit area by the area of the building affected by the fault.

In some embodiments, determining the cost of the fault using the regression model includes estimating an energy cost of the fault using the regression model and determining a monetary cost of the fault by multiplying the energy cost of the fault by a price per unit energy.

In some embodiments, the regression model is a univariate linear regression model including one or more regression model coefficients and a variable corresponding to a difference between the target value of the fault parameter and one of the multiple different values of the fault parameter.

In some embodiments, the regression model is a multivariate linear regression model including a plurality of regression model coefficients, a variable corresponding to a difference between the target value of the fault parameter and one of the multiple different values of the fault parameter, and a variable dependent on a weather condition or another operational parameter (e.g., building occupancy, water consumption, solar insolation, etc.).

In some embodiments, the target value of the fault parameter corresponds to a value of the fault parameter in the absence of a fault. In some embodiments, modulating the fault parameter comprises modulating the fault parameter while maintaining other parameters of the energy consumption model at fixed values.

Another implementation of the present disclosure is a system for monetizing faults in a building. The system includes a processing circuit configured to run an energy consumption model for the building to estimate an amount of energy consumed by the building as a function of a plurality of parameters. The processing circuit is further configured to modulate a fault parameter of the energy consumption model and use the energy consumption model to estimate an amount of energy consumed by the building at multiple different values of the fault parameter. The processing circuit is further configured to generate a first set of variables comprising multiple first differences in the fault parameter. Each of the first differences may correspond to a difference between a target value of the fault parameter and one of the multiple different values of the fault parameter. The processing circuit is further configured to generate a second set of variables comprising multiple second differences in the amount of energy estimated by the energy consumption model. Each of the second differences may correspond to a difference between an amount of energy estimated by the energy consumption model with the fault parameter at the target value and one of the amounts of energy estimated by the energy consumption model with the fault parameter at one of the multiple different values. The processing circuit is further configured to use the first set of variables and the second set of variables to develop a regression model for the fault parameter. The regression model may estimate a change in the amount of energy consumed by the building as a function of a change in the fault parameter. The processing circuit is further configured to determine a cost of a fault associated with the fault parameter using the regression model.

In some embodiments, the processing circuit is configured to develop a plurality of regression models. Each of the regression models may estimate a change in the amount of energy consumed by the building as a function of a change in a different fault parameter of the energy consumption model.

In some embodiments, the processing circuit is configured to receive multiple fault indications. Each of the fault indications may correspond to a different fault parameter of the energy consumption model. The processing circuit may be configured to use multiple different regression models to determine a cost associated with each of the multiple fault indications. Each of the multiple different regression models may be developed for one of the different fault parameters of the energy consumption model. The processing circuit may be configured to prioritize the multiple fault indications based on the cost associated with each of the multiple fault indications.

In some embodiments, determining the cost of the fault associated with the fault parameter using the regression model includes determining a difference between a current value of the fault parameter and the target value of the fault parameter, applying the difference between the current value of the fault parameter and the target value of the fault parameter as an input to the regression model developed for the fault parameter, and using the regression model to estimate a change in energy consumption resulting from the difference in the fault parameter.

In some embodiments, the processing circuit is configured to output a fault correction priority based at least partially on the cost of the fault. The fault correction priority may include at least one of a priority of correcting the fault relative to other faults, an indication of whether it would be cost effective to correct the fault, and an indication of whether the cost of the fault exceeds a cost threshold.

In some embodiments, the regression model is at least one of a univariate linear regression model or a multivariate linear regression model. The univariate linear regression model may include one or more regression model coefficients and a variable corresponding to a difference between the target value of the fault parameter and one of the multiple different values of the fault parameter. The multivariate linear regression model may include a plurality of regression model coefficients, a variable corresponding to a difference between the target value of the fault parameter and one of the multiple different values of the fault parameter, and a variable dependent on a weather condition, building occupancy water consumption, solar insolation, and/or any other variable that improves a correlation of the regression model.

Another implementation of the present disclosure is a system for prioritizing faults in a building. The system includes a processing circuit configured to develop an energy cost model for a fault parameter of a building energy consumption model. The energy cost model estimates a change in an amount of energy consumed by the building as a function of a change in the fault parameter. The processing circuit is further configured to determine a cost of a fault associated with the fault parameter using the energy cost model developed for the fault parameter.

In some embodiments, the processing circuit is configured to determine multiple different costs associated with multiple different degrees of the fault using the regression model developed for the fault parameter. Each of the different degrees of fault may correspond to a different change in the fault parameter.

In some embodiments, the processing circuit is configured to receive multiple fault indications. Each of the fault indications may correspond to a different fault parameter of the energy consumption model. The processing circuit may be further configured to develop and use multiple different energy cost models to determine a cost associated with each of the multiple fault indications. Each of the different energy cost models may be developed for one of the different fault parameters of the energy consumption model. The processing circuit may be further configured to prioritize the multiple fault indications based on the cost associated with each of the multiple fault indications.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 5-6 are drawings of a graphical user interface for monetizing and prioritizing building faults, according to an exemplary embodiment.

DETAILED DESCRIPTION

Figure 1:
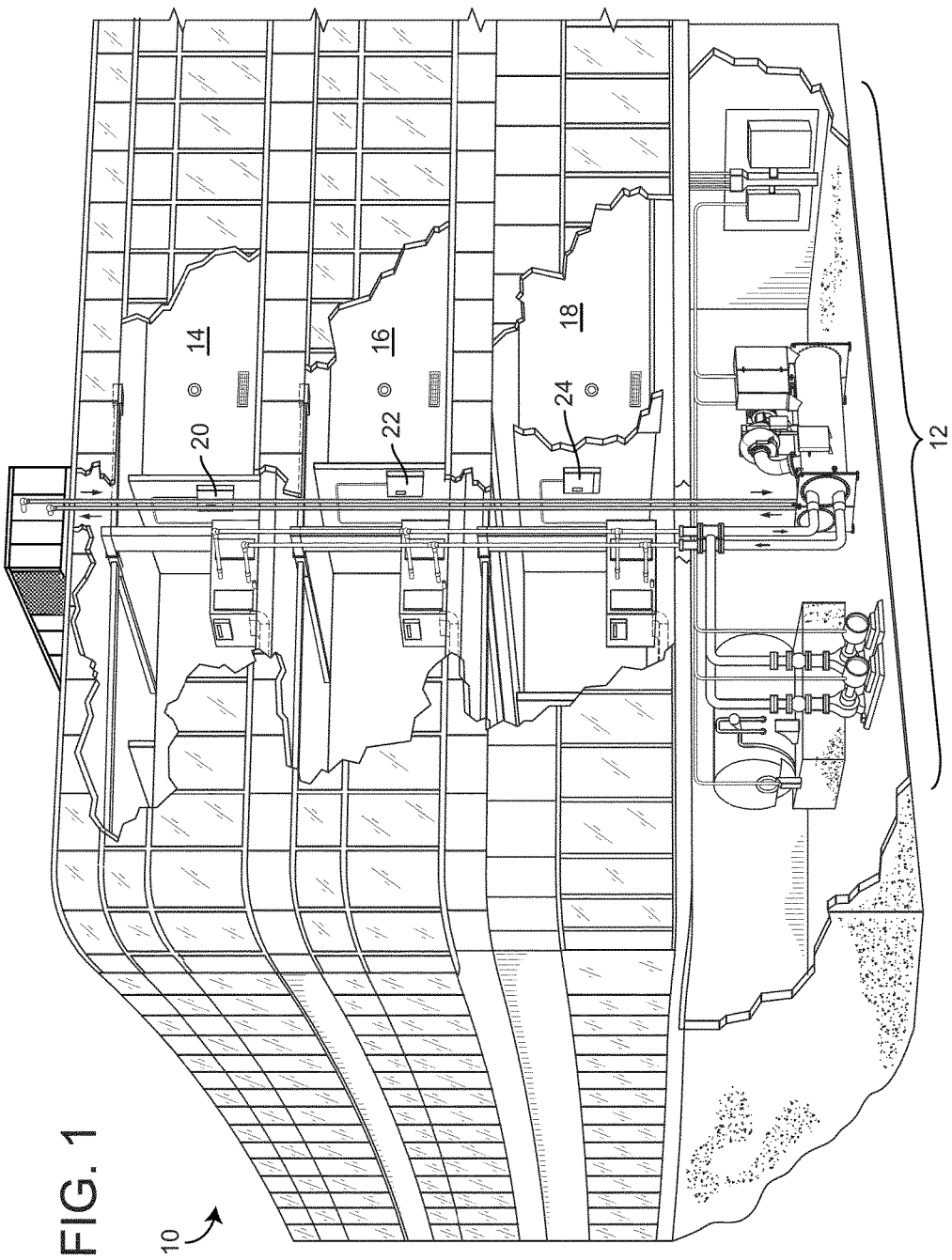
FIG. 1 is a drawing of a building equipped with a building management system (BMS), according to an exemplary embodiment.

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, systems and methods for monetizing building faults are shown, according to various exemplary embodiments. Building faults can be caused by faulty or failing equipment in a building management system (e.g., a stuck damper, an unstable power supply, an improperly calibrated controller, etc.). Building faults can increase energy consumption, decrease equipment lifespans, and cause other undesirable effects in a building or building system. Correcting detected faults has the potential to reduce energy consumption as well as the financial cost that a building owner pays for energy. However, the building owner may be required to devote considerable resources (e.g., both human and economic) to correct a detected fault. Correcting some faults may not be cost effective, for example, if the cost of correcting a fault exceeds the increase in energy consumption resulting from the fault.

The systems and methods described herein may be used to develop a database of regression models for a building or building system. Each regression model may be used to estimate a change in energy consumption (e.g., relative to a baseline energy consumption) as a function of a change in a particular fault parameter (i.e., a parameter of an energy consumption model affected by a fault). Multiple regression models can be developed for the same building or building system, each regression model corresponding to a different fault parameter. The change in energy consumption may be used to estimate a monetary cost associated with the fault.

The systems and methods of the present disclosure can use the estimated increase in energy consumption and/or monetary cost associated with a fault to determine whether it would be cost effective to correct a detected fault (e.g., if the monetary cost associated with a fault exceeds the repair cost) and to determine a fault correction priority (e.g., correcting faults that have the highest energy consumption or monetary cost first). In various embodiments, faults may be prioritized in terms of energy cost, monetary cost, and/or a safety or risk associated with the faults.

A computer system in accordance with the present disclosure may be configured to identify a parameter of an energy consumption model affected by a fault. In some embodiments, the energy consumption model is a simulation model (e.g., an EnergyPlus model) used to predict energy consumption as a function of multiple physical parameters of a building or building system. The fault parameter ($x_1$) may have a target value ($x_{1,0}$) under normal operating conditions (e.g., in the absence of a fault). The computer system may be configured to modulate the fault parameter and to use the energy consumption model to estimate a resulting energy consumption at multiple different values of the fault parameter.

For example, for each parameter of the energy consumption model that can be affected by a fault, the computer system may generate two corresponding sets of variables. The first set of variables may include differences (e.g., $\Delta x$ variables) between the modulated values of the fault parameter (e.g., $x_{1,1}$, $x_{1,2}$, $x_{1,3}$, etc.) and the target value of the fault parameter (e.g., $x_{1,0}$). The $\Delta x$ variables can be positive or negative depending on whether the modulated value of the fault parameter is above or below the target value (e.g., $\Delta x_{1,1} = x_{1,1} - x_{1,0}$, $\Delta x_{1,2} = x_{1,2} - x_{1,0}$, $\Delta x_{1,3} = x_{1,3} - x_{1,0}$, etc.). The second set of variables may include differences (e.g., $\Delta y$ variables) between the energy consumption predicted by the energy consumption model at each modulated value of the fault parameter (e.g., $\Delta y_{1,1} = f(x_{1,1})$, $y_{1,2} = f(x_{1,2})$, $y_{1,3} = f(x_{1,3})$, etc.) and the baseline energy consumption value (e.g., $y_{1,0} = f(x_{1,0})$) when the fault parameter is equal to the target value (e.g., $\Delta y_{1,1} = y_{1,1} - y_{1,0}$, $\Delta y_{1,2} = y_{1,2} - y_{1,0}$, $\Delta y_{1,3} = y_{1,3} - y_{1,0}$, etc.).

Using the two sets of variables (e.g., $\Delta x$ variables and $\Delta y$ variables), the computer system may develop a regression model for the fault parameter. The regression model may be used to estimate the change in the building energy consumption $\Delta y$ as a function of the change in the fault parameter $\Delta x$ and may include one or more regression coefficients (e.g., $\Delta y = \beta_1 + \beta_2 \Delta x$). The computer system may determine the values of the regression coefficients $\beta_1$ and $\beta_2$ using regression techniques. The value of the regression coefficient $\beta_2$ may correspond to the marginal energy cost associated with the fault.

The computer system may repeat the process outlined above for each parameter of the energy consumption model that can be affected by a fault. The values of the $\beta_2$ regression coefficient for various fault parameters can be compared to determine which fault has the highest marginal energy cost. The computer system may generate a database of regression models and/or regression coefficients for a given application (e.g., for a particular building or building site). In various embodiments, the computer system may be a component of a building management system or a separate computer system.

In some embodiments, the database of regression models and/or regression coefficients is generated by the computer system in an offline environment. For example, the environment in which the computer system operates to generate the database of regression models and/or regression coefficients may be completely separate from the online or live environment in which a controller for the building management system operates to actively control building conditions. However, the regression models generated in the offline environment may be used by the building management system to monetize faults detected in the online environment. For example, when a fault is detected by the building management system, a change in the fault parameter can be used as a variable input $\Delta x$ to a regression model previously developed (e.g., in an offline environment) for the fault parameter. The building management system may use the previously-developed regression model to estimate the change in energy consumption $\Delta\hat{y}$ resulting from the fault. The estimated change in energy consumption $\Delta\hat{y}$ can be translated into a monetary value by multiplying estimated change in energy consumption $\Delta\hat{y}$ by a cost of energy.

Referring now to FIG. 1, a perspective view of a building 10 is shown, according to an exemplary embodiment. Building 10 may be a commercial building (e.g., an office building, a retail store, a shipping facility, etc.), a residential building (e.g., an apartment building, a single-family residence, etc.), an industrial building (e.g., a manufacturing facility, a warehouse, etc.), or any other type of building (e.g., a hospitality facility, a data center, a school, a government building, a hospital, etc.).

Building 10 is shown to include a HVAC system 12. HVAC system 12 may include a cooling system, a heating system, a ventilation system, an air circulation system, or any combination thereof. HVAC system 12 may include one or more measurement devices (e.g., temperature sensors, pressure sensors, flow sensors, etc.), control devices (e.g., actuators, chillers, boilers, air handling units, variable air volume units, etc.), control units (e.g., a main control unit, an auxiliary control unit, a process controller, a supervisory controller, etc.), or other HVAC equipment/devices for monitoring and controlling any variable state or condition of building 10.

In some embodiments, HVAC system 12 is part of a comprehensive building management system (BMS) (e.g., BMS 22, described in greater detail with reference to FIG. 2). The BMS may include, for example, a HVAC subsystem, a security subsystem, a lighting subsystem, a fire alerting subsystem, an elevator subsystem, a water management subsystem, a food storage subsystem, a telephone subsystem, and/or other building subsystems. In some embodiments, the BMS a METASYS® brand building management system as sold by Johnson Controls, Inc.

Still referring to FIG. 1, building 10 is shown to include a plurality of zones 14-18 corresponding to various areas within building 10. For example, zone 14 may include the top floor of building 10, zone 16 may include the middle floor of building 10, and zone 18 may include the bottom floor of building 10. In some embodiments, zones 14-18 are monitored and controlled independently. For example, zone 14 may be controlled by controller 20, zone 16 may be controlled by controller 22, and zone 18 may be controlled by controller 24. Controllers 20-24 may receive input from one or more sensors located within zones 14-18 (e.g., temperature sensors, pressure sensors, flow rate sensors, humidity sensors, etc.) and may provide control signals to one or more control devices configured to affect a variable state or condition within zones 14-18 (e.g., dampers, actuators, air handling units, etc.). In some embodiments, zones 14-18 are controlled by a single supervisory controller (e.g., a BMS controller) located within building 10 or at a remote location.

Figure 2:
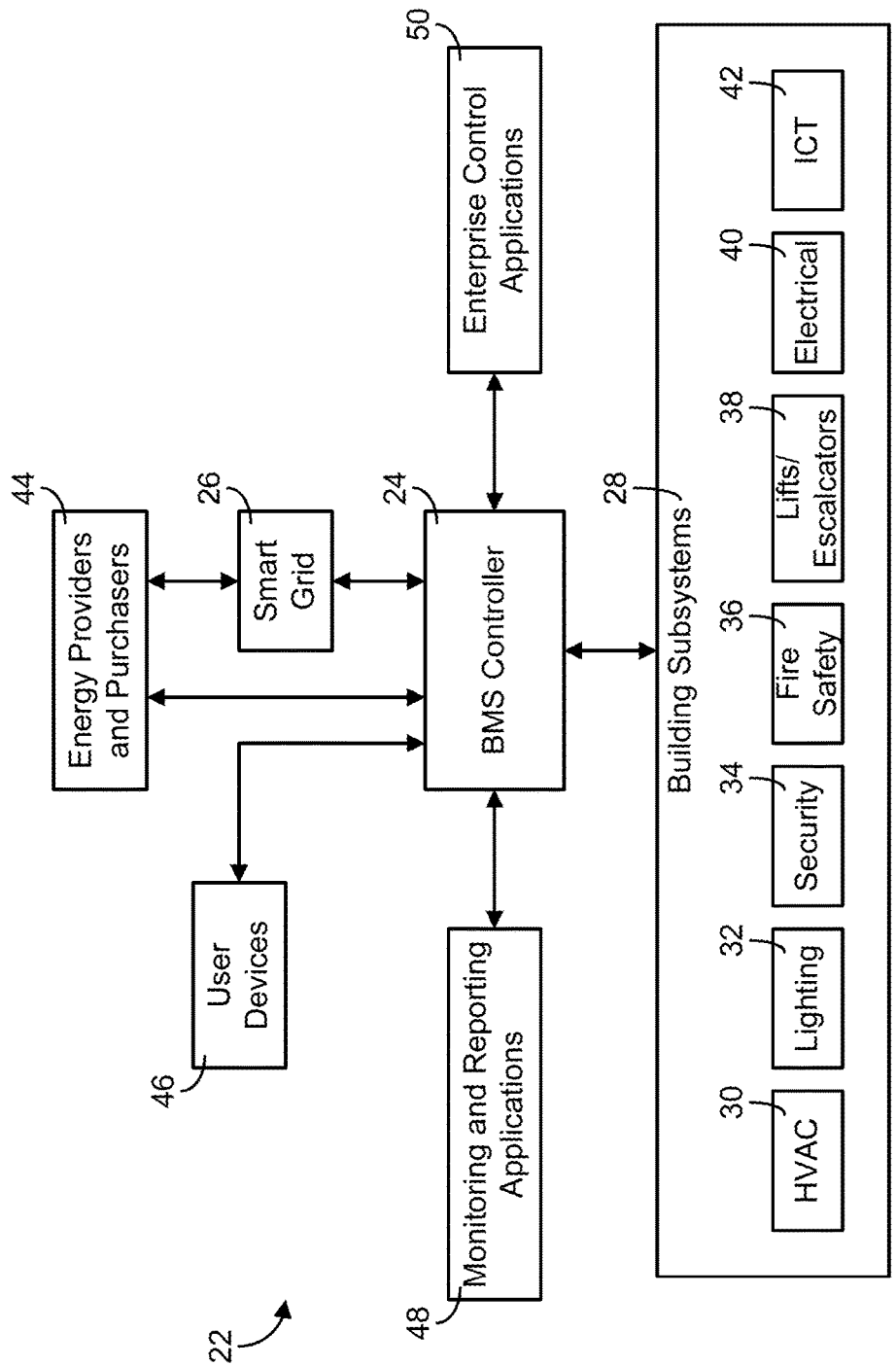
FIG. 2 is a block diagram of the building management system of FIG. 1 including a BMS controller and a variety of building subsystems, according to an exemplary embodiment.

Referring now to FIG. 2, a block diagram of a building management system (BMS) 22 is shown, according to an exemplary embodiment. BMS 22 may be installed at least partially within building 10 to monitor and control the activities thereof. BMS 22 is shown to include a BMS controller 24 connected to a smart grid 26 and a plurality of building subsystems 28. In some embodiments, BMS controller 24 is integrated within a single computer (e.g., one server, one housing, etc.). In various other exemplary embodiments BMS controller 24 can be distributed across multiple servers or computers. For example, BMS controller 24 may be part of a cloud-based building efficiency system such as the PANOPTIX® brand system by Johnson Controls, Inc.

Building subsystems 28 represent various subsystems that may exist within building 10. For example, building subsystems 28 may include a HVAC subsystem 30, a lighting subsystem 32, a security subsystem 34, a fire safety subsystem 36, a lifts/escalators subsystem 38, an electrical subsystem 40, and/or an information communication technology (ICT) subsystem 42. In various embodiments, building subsystems 28 can include fewer, additional, or alternative subsystems. For example, building subsystems 28 may also or alternatively include a refrigeration subsystem, an advertising or signage system subsystem, a cooking subsystem, a vending subsystem, and/or a printer or copy service subsystem. Conventionally these systems are autonomous and managed by separate control systems. BMS controller 24 may be configured to achieve energy consumption and energy demand reductions by integrating the management of building subsystems 28.

Each of building subsystems 28 include any number of devices, controllers, and connections for completing their individual functions and control activities. For example, HVAC subsystem 30 may include a chiller, a boiler, any number of air handling units, economizers, field controllers, supervisory controllers, actuators, temperature sensors, or other devices for controlling the temperature within a building. As another example, lighting subsystem 32 may include any number of light fixtures, ballasts, lighting sensors, dimmers, or other devices configured to controllably adjust the amount of light provided to a building space. Security subsystem 34 may include occupancy sensors, video surveillance cameras, digital video recorders, video processing servers, intrusion detection devices, access control devices and servers, or other security-related devices.

BMS controller 24 may be configured to communicate (e.g., via one or more communications interfaces) with energy providers and purchasers 44 outside building 10 (e.g., directly or via smart grid 26) and with building subsystems 28 within building 10. BMS controller 24 may also communicate with user devices 46 (e.g., directly or via monitoring and reporting applications 48) to facilitate user control, monitoring, and adjusting of BMS controller 24 and/or building subsystems 28. Enterprise control applications 50 may be configured to provide subsystem-spanning control to a graphical user interface (GUI) or to any number of enterprise-level business applications (e.g., accounting systems, user identification systems, etc.). Enterprise control applications 50 may also or alternatively be configured to provide configuration GUIs for configuring BMS controller 24. In some embodiments, enterprise control applications 50 can work with BMS controller 24 to optimize building performance (e.g., efficiency, energy use, comfort, safety, etc.) based on inputs received (directly or indirectly) from building subsystems 28, user devices 46, and/or energy providers and purchasers 44. Although FIG. 2 shows applications 48 and 50 as existing outside of BMS controller 24, in some embodiments applications 48 and 50 may be hosted within BMS controller 24 (e.g., within a memory device of BMS controller 24).

Figure 3A:
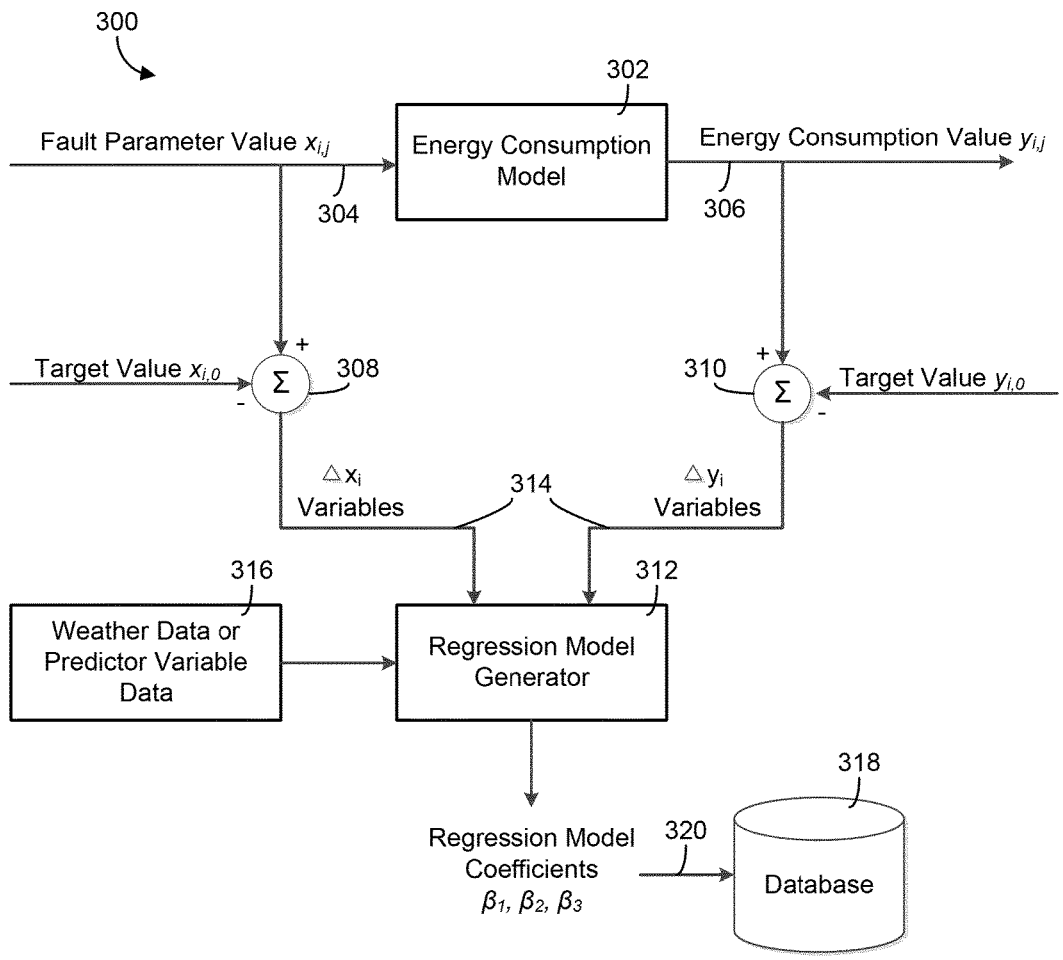
FIG. 3A is a flow diagram of a process for developing a regression model for a fault parameter of a building or building system, according to an exemplary embodiment.

Referring now to FIG. 3A, a flow diagram illustrating a process 300 for generating a regression model for a building or building system is shown, according to an exemplary embodiment. Regression models developed using process 300 may be used to estimate a change in energy consumption as a function of a change in a particular fault parameter. Process 300 may be repeated for multiple different fault parameters to develop multiple regression models for the same building or building system. Each regression model may correspond to a different fault parameter and may be used to estimate a change in energy consumption as a function of a change in the corresponding fault parameter.

In some embodiments, process 300 is performed in an offline environment. For example, the environment in which process 300 is performed may be completely separate from the active control environment in which BMS controller 24 operates to control BMS 22. However, the regression models developed in the offline environment may be used by BMS controller 24 or another computer system in an online environment to monetize various faults.

Process 300 is shown to include providing an energy consumption model 302 with a value $x_i$ of a fault parameter (step 304). Fault parameter value $x_{i,j}$ may be a modulated value of a particular fault parameter $x_i$ which deviates from a target value $x_{i,0}$ of the fault parameter. In some embodiments, energy consumption model 302 is a simulation model (e.g., an EnergyPlus model, an eQuest model, a Trnsys model, etc.) which can be used to estimate a building's energy consumption as a function of multiple parameters. Energy consumption model 302 may output an energy consumption value $y_{i,j}$ (step 306). Energy consumption value $y_{i,j}$ may be a function of the fault parameter value $x_{i,j}$ provided to energy consumption model 302.

Still referring to FIG. 3A, process 300 is shown to include calculating a variable $\Delta x_{i,j}$ representing a difference between the fault parameter value $x_{i,j}$ and the target value $x_{i,0}$ of the fault parameter (step 308). In some embodiments, the variable $\Delta x_{i,j}$ may be calculated by subtracting the target value of the fault parameter from the modulated fault parameter value (e.g., $\Delta x_{i,j}=x_{i,0}-x_{i,j}$). Variable $\Delta x_{i,j}$ may be positive or negative depending on whether $x_{i,j}$ is greater than $x_{i,0}$ or less than $x_{i,0}$.

Process 300 shown to further include determining a variable $\Delta y_{i,j}$ representing a difference between the energy consumption value $y_{i,j}$ and a target energy consumption value $y_{i,0}$ (step 310). In some embodiments, the target energy consumption value $y_{i,0}$ may be determined by providing energy consumption model 302 with the target value $x_{i,0}$ of the fault parameter. For example, target energy consumption value $y_{i,0}$ may be an output of energy consumption model 302 when target value $x_{i,0}$ is provided as an input. The variable $\Delta y_{i,j}$ may be calculated by subtracting the target energy consumption value from output energy consumption value (e.g., $\Delta y_{i,j}=y_{i,j}-y_{i,0}$). Variable $\Delta y_{i,j}$ may be positive or negative depending on whether $y_{i,j}$ is greater than $y_{i,0}$ or less than $y_{i,0}$.

Steps 304-310 may be repeated for multiple different values of the fault parameter $x_{i,j}$ (e.g., j=1 . . . n). For each value of the fault parameter $x_i$, variables $\Delta x_{i,j}$ and $\Delta y_{i,j}$ may be calculated. The first set of variables (i.e., $\Delta x_{i,1}$, $\Delta x_{i,2}, \ldots, \Delta x_{i,n}$) and the second set of variables (i.e., $\Delta y_{i,1}$, $\Delta y_{i,2}, \ldots, \Delta y_{i,n}$) may be provided to a regression model generator 312 (step 314). Regression model generator 312 may use the two sets of variables (i.e., the $\Delta x$ variables and $\Delta y$ variables) to develop a regression model for the fault parameter. The regression model may estimate the change in the building energy consumption $\Delta y$ as a function of the variable change $\Delta x$ in the fault parameter.

The regression model generated by regression model generator 312 may include one or more regression coefficients (e.g., $\Delta y=\beta_1+\beta_2\Delta x$). Regression model generator 312 may determine the values of the regression coefficients $\beta_1$ and $\beta_2$ using a regression technique (e.g., partial least squares regression, ridge regression, ordinary least squares regression, etc.) based on the values for $\Delta x_{i,j}$ and $\Delta y_{i,j}$ (j=1 . . . n) calculated in steps 308 and 310. The value of the regression coefficient $\beta_2$ may correspond to the marginal energy cost associated with the fault. In some embodiments, regression model generator 312 uses weather data or other predictor variable data 316 to develop the regression model. For example, the regression model may be of the form $$\Delta y=\beta_1+\beta_2\Delta x+\beta_3 OAX_{avg}$$

where $OAX_{avg}$ is a weather parameter (e.g., average temperature, relative humidity, enthalpy, etc.).

Still referring to FIG. 3A, process 300 is shown to include storing the regression model coefficients $\beta_1$ and/or the regression model in a database 318 (step 320). Process 300 may be repeated for various fault parameters $x_i$ (i=1 . . . m) to develop and store a regression model for each fault parameter. When a deviation in a fault parameter is subsequently detected, the variable $\Delta x$ can be calculated. The appropriate regression model (e.g., the model corresponding to the fault parameter) may be retrieved from database 318 and used to estimate the change in energy consumption $\Delta \hat{y}$ resulting from the deviation $\Delta x$ in the fault parameter.

Figure 3B:
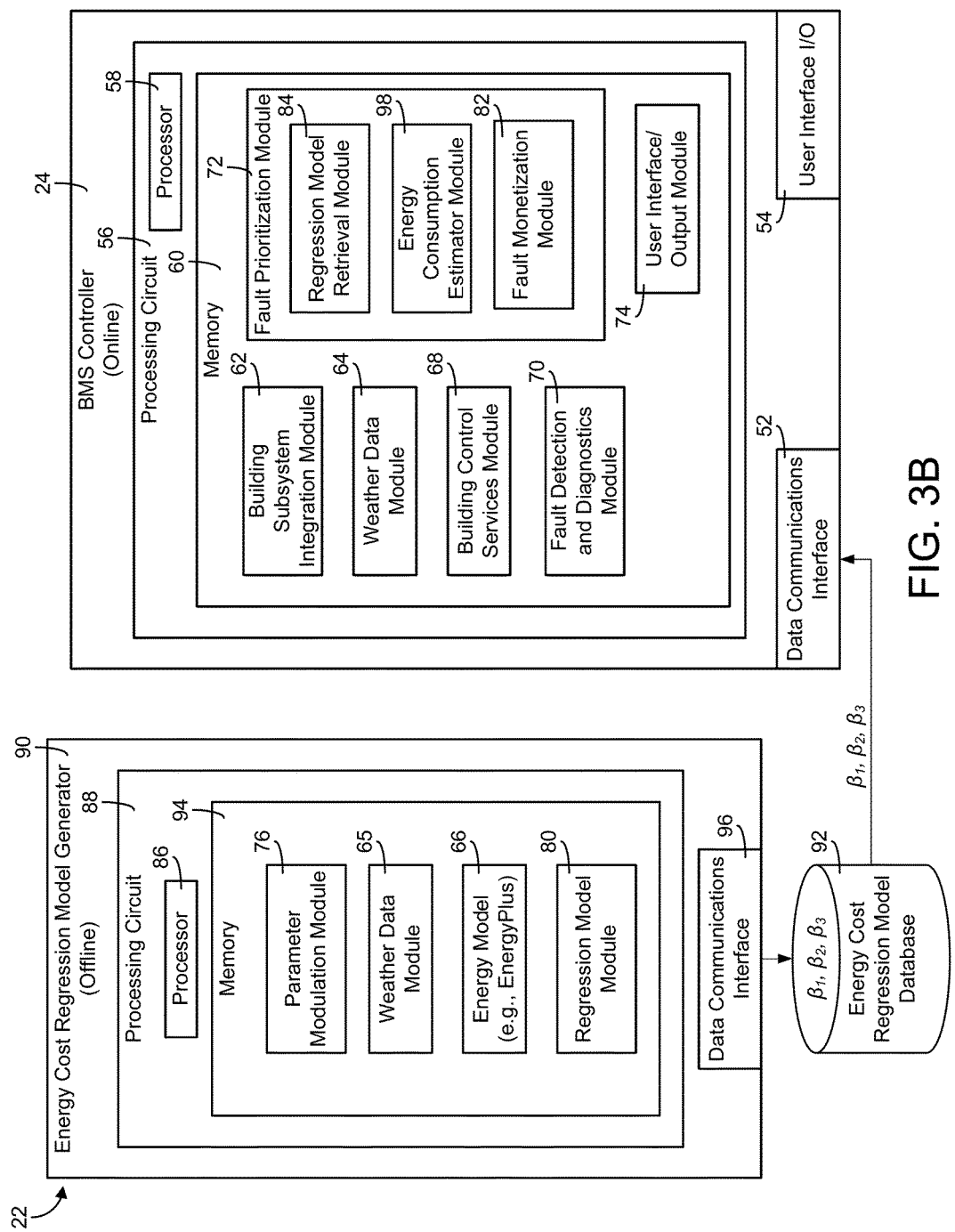
FIG. 3B is a block diagram illustrating a portion of the BMS of FIG. 1 in greater detail including an energy cost regression model generator and a separate BMS controller, according to an exemplary embodiment.
Figure 3C:
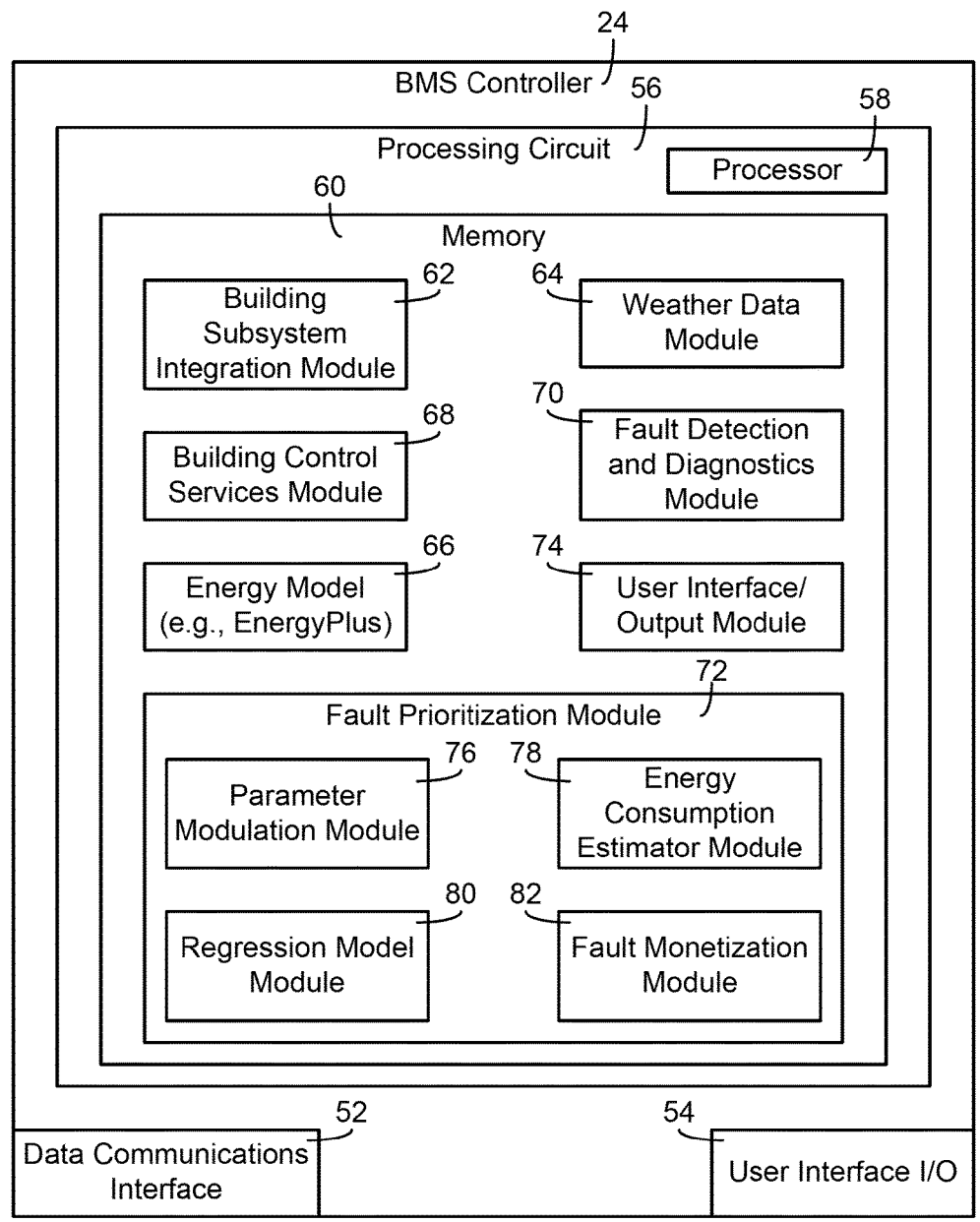
FIG. 3C is a block diagram illustrating an alternative implementation of BMS shown in FIG. 3B in which the energy cost regression model generator and the BMS controller are combined into a single integrated component, according to an exemplary embodiment.

Referring now to FIGS. 3B-3C, a block diagram illustrating a portion of BMS 22 in greater detail is shown, according to an exemplary embodiment. In FIG. 3B, BMS 22 is shown to include an energy cost regression model generator 90 and a BMS controller 24. In various embodiments, energy cost regression model generator 90 and BMS controller 24 may be separate components (as shown in FIG. 3B) or integrated into a single component (as shown in FIG. 3C). Energy cost regression model generator 90 may run in an offline environment to generate a regression model and/or regression coefficients for each of a plurality of fault parameters. The regression models and/or regression coefficients generated by energy cost regression model generator 90 may be stored in an energy cost regression model database 92 (e.g., a distributed storage database at a remote location). BMS controller 24 may run in an online environment to control BMS 22. BMS controller 24 may use the regression models and/or regression coefficients generated by energy cost regression model generator 90 to monetize and prioritize detected faults.

Referring specifically to FIG. 3B, energy cost regression model generator 90 is shown to include a data communications interface 96 and a processing circuit 88. Data communications interface 96 may include wired or wireless interfaces (e.g., jacks, antennas, transmitters, receivers, transceivers, wire terminals, etc.) for conducting electronic data communications with various components BMS 22 or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, data communications interface 96 can include an Ethernet card and port for sending and receiving data via an Ethernet-based communications link or network. In various embodiments, data communications interface 96 can include a WiFi transceiver, a cellular transceiver, or a mobile phone transceiver for communicating via a wireless communications network. Data communications interface 96 may be used conduct electronic data communications between energy cost regression model generator 90, BMS controller 24, energy cost regression model database 92, and/or other components of BMS 22.

Still referring to FIG. 3B, processing circuit 88 is shown to include a processor 86 and memory 94. Processor 86 can be implemented as one or more microprocessors (e.g., CPUs, GPUs, etc.), an application specific integrated circuit (ASIC), one or more field programmable gate arrays (FPGAs), a circuit containing one or more processing components, a group of distributed processing components (e.g., processing components in communication via a data network or bus), circuitry for supporting a microprocessor, or other hardware configured for processing data. Processor 86 may be configured to execute computer code stored in memory 94 to complete and facilitate the activities described herein.

Memory 94 may include one or more devices (e.g., RAM, ROM, solid state memory, hard disk storage, etc.) for storing data and/or computer code for completing or facilitating the various processes, layers, and modules of the present disclosure. Memory 94 may include volatile memory or non-volatile memory. Memory 94 may include database components, object code components, script components, or any other type of information structure for supporting the various activities and information structures of the present disclosure. According to an exemplary embodiment, memory 94 is communicably connected to processor 86 via processing circuit 88 and includes computer code for executing (e.g., by processing circuit 88 and/or processor 86) one or more processes described herein. In brief overview, memory 94 is shown to include an energy model module 66, a parameter modulation module 76, a weather data module 65, and a regression model module 80.

Still referring to FIG. 3B, memory 94 is shown to include an energy model module 66. Energy model module 66 may provide one or more energy consumption models for building 10 and/or BMS 22. An energy consumption model or energy use model may be used to predict an amount of energy consumed by BMS 22 or a subsystem thereof as a function of one or more predictor variables and one or more model parameters. An energy consumption model can apply to building 10 or BMS 22 as a whole (e.g., a "whole building" energy consumption model) or to an individual subsystem of BMS 22 (e.g., HVAC subsystem 30, lighting subsystem 32, fire safety subsystem 36, etc.).

In some embodiments, energy model module 66 provides a simulation model (e.g., an EnergyPlus model) which can be used to estimate the energy consumption of building 10 and/or BMS 22 as a function of multiple model parameters. Model parameters can be physical parameters (e.g., building type, building materials, HVAC system components, etc.), control parameters (e.g., controller setpoints, tuning parameters, operating schedule, etc.), measured parameters (e.g., measured flow rates, measured damper positions, etc.), or other parameters which affect the energy consumption of a building or building system.

In some embodiments, energy model 66 module uses one or more predictor variables to estimate the building energy consumption. Predictor variables may include, for example, weather-related predictor variables (e.g., outside air temperature, outside air enthalpy, etc.) and other predictor variables which have an effect on the building energy consumption (e.g., building static pressure, air flow rate, water consumption, building occupancy, etc.). Energy model module 66 may incorporate or use one or more equations representing physical principles (e.g., heat transfer principles, thermodynamic principles, etc.) to estimate the building energy consumption as a function of the model parameters and/or predictor variables.

Energy model module 66 may provide an energy consumption model of any form. In some embodiments, the energy consumption model is an energy simulation model such as an EnergyPlus model or other similar simulation-based model. In other embodiments, the energy consumption model may be a parametric model (e.g., a linear regression model, a non-linear regression models, etc.), a non-parametric model (e.g., a neural network model, a kernel estimation model, a hierarchical Bayesian model, etc.), or something in between (e.g., a Gaussian process model).

In various embodiments, the energy consumption model may be stored locally (e.g., within memory 94) or remotely. Energy model module 66 may provide access to a remotely-stored energy consumption model (e.g., a data connection, a user interface, etc.) and may facilitate interaction with the energy consumption model. For example, energy model module 66 may provide an interface through which model parameters can be specified and provided as inputs to the energy consumption model. The model parameters may be specified by a user or generated automatically by parameter modulation module 76 (described in greater detail below).

The energy consumption model may include one or more model parameters $x_1 \ldots x_n$ which can be affected by a fault (i.e., fault parameters). For example, if one of the model parameters $x_i$ corresponds to a measured air flow rate, a faulty AHU or leaky damper can affect the value of the model parameter $x_i$. A fault in the building equipment can cause BMS 22 to be less energy efficient and may result in a greater energy consumption for the same values of the predictor variables. For example, a faulty chiller or air handling unit may result in a greater energy consumption to cool the air within building 10 to the same setpoint temperature under the same weather conditions.

Model parameters $x_1 \ldots x_m$ may have target values. A target value for a model parameter may be a baseline value that the model parameter is expected to have under normal operation of BMS 22 (e.g., in the absence of a fault). Faults in the building equipment can cause the model parameters to deviate from the target values. In some embodiments, a fault is defined by a deviation in one or more of the model parameters from the target value or values by an amount exceeding a fault threshold.

Still referring to FIG. 3B, memory 94 is shown to include a weather data module 65. Weather data module 65 may obtain and store weather data for one or more geographic locations. For example, weather data may include historical, current, or predicted data regarding a location's temperature (e.g., outside air temperature), humidity, atmospheric pressure, wind speed, precipitable water, or other weather-related data. In some embodiments, weather data may be gathered via sensors located at or near building 10. Weather data may include weather data from any number of different time periods having any degree of granularity. For example, weather data may identify weather conditions on a monthly, weekly, daily, or hourly level.

In some embodiments, weather data includes typical meteorological year (TMY) data received from a historical weather data source (e.g., a computer system of the National Oceanic and Atmospheric Administration or similar data source). In the United States of America, the first set of TMY data was collected between 1948-1980 from various locations throughout the country. A second set of TMY data (TMY2), which also includes data regarding precipitable moisture, was collected between 1961-1990. In addition, a third set of TMY data (TMY3), was collected from many more locations than TMY2 data over the span of 1976-1995. Regardless of the version used, TMY data may be used to compare current conditions to normal or predicted conditions, in some embodiments. In further embodiments, TMY data may be used to predict future conditions of a building (e.g., by using the historical data to predict typical future weather conditions) or future energy consumptions by a building. For example, TMY data may be used to predict an average outdoor temperature change for a building during the upcoming month of March. As used herein, "TMY data" may refer to any version or set of TMY data (e.g., TMY2 data, TMY3 data, etc.).

The weather data provided by weather data module 65 may be used as a variable input regression model module 80. Regression model module 80 may use the weather data to generate an energy cost regression model that is a function of one or more weather-related variables.

Still referring to FIG. 3B, memory 94 is shown to include a parameter modulation module 76. Parameter modulation module 76 may be configured to modulate (e.g., variably adjust, increase, decrease, alter, change, etc.) a parameter $x_i$ of the energy consumption model provided by energy use model module 66. In some embodiments, parameter modulation module 76 individually modulates multiple different parameters of the energy consumption model while maintaining the other model parameters at their target values. For example, parameter modulation module 76 may set the parameter $x_1$ to multiple different values (e.g., $x_{1,0}$, $x_{1,1}$, $x_{1,2}$, ..., $x_{1,n}$) while holding the other model parameters at their target values (e.g., $x_{2,0}$, $x_{3,0}$, $x_{4,0}$, etc.). In other embodiments, parameter modulation module 76 may modulate two or more parameters together (e.g., for implementations in which a single fault can affect multiple parameters simultaneously).

Parameter modulation module 76 may be configured to generate a first set of variables for each modulated parameter $x_i$ of the energy consumption model. The first set of variables may include multiple differences (i.e., $\Delta x$ variables) between the adjusted value of the modulated parameter and the target value of the modulated parameter at each of the multiple different values for the modulated parameter. For example, if $x_1$ is the modulated parameter, parameter modulation module 76 may generate a set of $\Delta x_1$ variables, each of which is a difference between the target value of the $x_1$ parameter (i.e., $x_{1,0}$) and one of the adjusted values of the $x_1$ parameter (e.g., $\Delta x_{1,1}=x_{1,1}-x_{1,0}$, $\Delta x_{1,2}=x_{1,2}-x_{1,0}$, etc.). The $\Delta x$ variables may be positive or negative depending on whether the adjusted value of the modulated parameter is greater than or less than the target value. Each of the $\Delta x$ variables may represent a change in the modulated parameter from the baseline or target value under normal operating conditions (e.g., in the absence of a fault).

Parameter modulation module 76 may be configured to predict an energy consumption at each of the multiple different values of the modulated parameter. Parameter modulation module 76 may use the energy consumption model provided by energy model module 66 to calculate the predicted energy consumption. In some embodiments, parameter modulation module 76 sets each of the parameters of the energy consumption model to their target values (i.e., $x_{1,0}, \ldots, x_{m,0}$) to calculate a baseline energy consumption. For example, parameter modulation module 76 may determine a baseline energy consumption $\hat{y}_0$ using the target values of the model parameters as inputs to the energy consumption model:

$$\hat{y}_0 = f(x_{1,0}, x_{2,0}, x_{3,0}, \ldots, x_{n,0})$$

where $\hat{y}_0$ is the baseline energy consumption and the "comma-zero" notation indicates that each of the model parameters $x_i$ is at its target value (i.e., $x_{1,0}$, $x_{2,0}$, etc.).

Parameter modulation module 76 may be configured to replace a modulated parameter $x_i$ of the energy consumption model with each of the multiple adjusted values of the modulated parameter (e.g., $x_{i,1}$, $x_{i,2}$, ..., $x_{i,n}$) and to calculate an estimated energy consumption (e.g., $\hat{y}_{i,1}$, $\hat{y}_{i,2}$, ..., $\hat{y}_{i,n}$) with the modulated parameter at each of the multiple adjusted values. For example, if $x_1$ is the modulated parameter, parameter modulation module 76 may be configured to replace the target parameter $x_{1,0}$ with each of the multiple adjusted values for the $x_1$ parameter (i.e., $x_{1,1}$, $x_{1,2}$, $x_{1,3}$, ..., $x_{1,n}$). In some embodiments, parameter modulation module 76 replaces the modulated parameter while maintaining the other model parameters at their target values.

For each of the multiple adjusted values of the modulated parameter, parameter modulation module 76 may calculated an estimated energy consumption value. For example, parameter modulation module 76 may calculate a first estimated energy consumption value $\hat{y}_{1,1}$ by setting the modulated parameter $x_1$ to the first adjusted value $x_{1,1}$ as shown in the following equation:

$$\hat{y}_{1,1} = f(x_{1,1}, x_{2,0}, x_{3,0}, \ldots, x_{m,0})$$

Parameter modulation module 76 may repeat this process for each of the n multiple values of the modulated parameter, estimating n energy consumption values as shown in the following equations:

$$\hat{y}_{1,2} = f(x_{1,2}, x_{2,0}, x_{3,0}, \ldots, x_{m,0})$$
$$\hat{y}_{1,3} = f(x_{1,3}, x_{2,0}, x_{3,0}, \ldots, x_{m,0})$$
$$\vdots$$
$$\hat{y}_{1,n} = f(x_{1,n}, x_{2,0}, x_{3,0}, \ldots, x_{m,0})$$

Parameter modulation module 76 may repeat the parameter replacement and estimation process for each of the modulated parameters $x_1 \ldots x_m$, estimating multiple energy consumption values for each modulated parameter. For example, parameter modulation module 76 may estimate multiple energy consumption values (i.e., $\hat{y}_{1,1}$, $\hat{y}_{1,2}$, $\hat{y}_{1,3}$, ..., $\hat{y}_{1,n}$) for the $x_1$ parameter using the multiple adjusted values of the $x_1$ parameter (i.e., $x_{1,1}$, $x_{1,2}$, $x_{1,3}$, ..., $x_{1,n}$) as inputs to the energy consumption model. Parameter modulation module 76 may estimate multiple energy consumption (i.e., $\hat{y}_{2,1}$, $\hat{y}_{2,2}$, $\hat{y}_{2,3}$, ..., $\hat{y}_{2,n}$) values for the $x_2$ parameter using the multiple adjusted values of the $x_2$ parameter (i.e., $x_{2,1}$, $x_{2,2}$, $x_{2,3}$, ..., $x_{2,n}$) as inputs to the energy consumption model. Parameter modulation module 76 may estimate multiple energy consumption values for each remaining modulated parameter of the energy consumption model.

Parameter modulation module 76 may be configured to generate a second set of variables for each modulated parameter $x_i$ of the energy consumption model. The second set of variables may include multiple differences (i.e., $\Delta y$ variables) between the baseline energy consumption value $\hat{y}_{i,0}$ and one of the estimated energy consumption values (e.g., $\Delta y_{i,1}=\hat{y}_{i,1}-\hat{y}_{i,0}$, $\Delta y_{i,2}=\hat{y}_{i,2}-\hat{y}_{i,0}$, $\Delta y_{i,3}=\hat{y}_{i,3}-\hat{y}_{i,0}$, etc.) for a particular fault parameter. The $\Delta y$ variables may be positive or negative depending on whether the estimated energy consumption value is greater than or less than the baseline value. Each of the $\Delta y$ variables may represent a change in the energy consumption attributable to a fault relative to the baseline energy consumption under normal operating conditions (e.g., in the absence of a fault). Parameter modulation module 76 may generate a different set of $\Delta y$ variables for each modulated parameter.

Still referring to FIG. 3B, memory 94 is shown to include a regression model module 80. Regression model module 80 may be configured to develop a regression model for each modulated parameter $x_i$ of the energy consumption model using the corresponding sets of $\Delta x$ variables and $\Delta y$ variables. In some embodiments, regression model module 80 develops a univariate regression model having the form:

$$\Delta y = \beta_1 + \beta_2 \Delta x$$

where $\Delta y$ is the change in energy consumption from the baseline energy consumption (e.g., determined by energy consumption estimator module 78), $\Delta x$ is the change in the modulated parameter from the target value (e.g., determined by parameter modulation module 76), and $\beta_1$ and $\beta_2$ are regression coefficients. In some embodiments, $\Delta y$ and $\beta_1$ have units of energy per unit area (e.g., J/m$^2$) and $\beta_2$ has units that depend on the units of $\Delta x$.

In some embodiments, regression model module 80 develops a multivariate regression model having the form:

$$\Delta y = \beta_1 + \beta_2 \Delta x + \beta_3 OAX_{avg}$$

where $\Delta y$, $\Delta x$, $\beta_1$, and $\beta_2$ represent the same types of items as described with respect to the univariate case, $OAX_{avg}$ is a weather parameter (e.g., average temperature, relative humidity, enthalpy, etc.) and $\beta_3$ is regression coefficient. The multivariate model may be appropriate for implementations in which energy consumption is also weather dependent or where the change in energy consumption resulting from a fault varies with weather conditions. For example, if a faulty damper causes an airflow path from outside a building to inside the building to remain open, energy losses may be significantly greater if the building is situated in a very cold climate relative to the energy losses if the building were situated in a moderate climate. Thus, the same fault can result in different changes in energy consumption for buildings in different climates or otherwise experiencing different weather conditions.

In some embodiments, regression model module 80 is configured to determine whether the change in energy consumption resulting from a particular fault is weather dependent. If the energy consumption resulting from the fault is not weather dependent, regression model module 80 may use the univariate model to model the change in energy consumption. However, if the energy consumption resulting from the fault is weather dependent, regression model module 80 may use the multivariate model to model the change in energy consumption.

Regression model module 80 may use any of a variety of different estimation techniques to estimate the values of the regression coefficients $\beta_1$, $\beta_2$, and $\beta_3$. In some embodiments, regression model module 80 uses a partial least squares regression (PLSR) method. In other embodiments, regression model module 80 may use other methods, such as ridge regression (RR), principal component regression (PCR), weighted least squares regression (WLSR), or ordinary least squares regression (OLSR). In various embodiments, the regression model may be a linear regression model or a non-linear regression model (e.g., a model including a non-linear polynomial, an exponential function, a trigonometric function, a logarithm, and/or other non-linear terms).

The regression model developed by regression model module 80 for a particular model parameter can be used to estimate a change in energy consumption resulting from a fault that affects the model parameter. Advantageously, the regression models allow for the change in energy consumption to be estimated at multiple degrees of the same fault. For example, if the model parameter deviates from the target value by a small amount $\Delta x_a$, the value of $\Delta x_a$ can be plugged into the regression model to determine a corresponding change in energy consumption $\Delta y_a$. If the model parameter deviates from the target value by a large amount $\Delta x_b$, the value of $\Delta x_b$ can be plugged into the same regression model to determine the corresponding change in energy consumption $\Delta y_b$. The regression models developed by regression model module 80 may be stored in a data storage or memory device (e.g., memory 60).

Regression model module 80 may generate a database of regression models for a building or building system. Each regression model may correspond to a different model parameter. For example, regression model module 80 may generate a first regression model using the $\Delta x$ and $\Delta y$ variables for a first model parameter $x_1$. Regression model module 80 may generate a second regression model using the $\Delta x$ and $\Delta y$ variables for a second model parameter $x_2$. Regression model module 80 may repeat this process for each model parameter $x_1, \ldots, x_n$). Each regression model may be used to estimate the change in energy consumption resulting from a deviation in a different fault parameter. In some embodiments, regression model module 80 runs in an offline environment to generate the set of regression models prior to detecting actual faults. Regression model module 80 may store the set of regression models and/or regression coefficients in energy cost regression model database 92. The regression models and/or regression coefficients may be subsequently retrieved by BMS controller 24 to monetize and prioritize actual faults in an online environment.

Still referring to FIG. 3B, BMS controller 24 is shown to include a data communications interface 52, a user interface I/O 54, and a processing circuit 56. Data communications interface 52 may include wired or wireless interfaces (e.g., jacks, antennas, transmitters, receivers, transceivers, wire terminals, etc.) for conducting electronic data communications with various components BMS 22 or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, data communications interface 52 can include an Ethernet card and port for sending and receiving data via an Ethernet-based communications link or network. In various embodiments, data communications interface 52 can include a WiFi transceiver, a cellular transceiver, or a mobile phone transceiver for communicating via a wireless communications network. Data communications interface 52 may be used conduct electronic data communications between BMS controller 24, energy cost regression model generator 90, energy cost regression model database 92, and building subsystems 28.

In some embodiments, data communications interface 52 may be used conduct electronic data communications between BMS controller 24 and building subsystems 28. Data communications interface 52 may be configured to send and receive data communications (e.g., sensor data, input signals, output signals, etc.) from a plurality of multi-vendor/multi-protocol systems. For example, data communications interface 52 may be configured to communicate with disparately protocolled devices or networks (e.g., different building subsystems, differently protocolled smart-grid sources, etc.). Communications protocols may be vendor specific (e.g., Johnson Controls, Honeywell, Siemens, etc.), standards-based (e.g., BACnet, ANSI C12.19, Lon Works, Modbus, RIP, SNMP, SOAP, web services, HTML, HTTP/HTTPS, XML, XAML, TFTP, DHCP, DNS, SMTP, SNTP, etc.), user built, user selected, and/or user customized. In some embodiments, data communications interface 52 is configured to translate data between different communications protocols to facilitate data communications with differently protocolled systems and/or devices. In other embodiments, translation and normalization services may be performed by processing circuit 56.

Still referring to FIG. 3B, BMS controller 24 is shown to include a user interface I/O 54. User interface I/O 54 may include one or more user interface input and/or output devices for facilitating user interaction with BMS controller 24 and BMS 22. User interface I/O 54 may include, for example, a local display (e.g., a LCD panel, an electronic display screen, one or more indicator lights, etc.), a keyboard, a mouse, a printer, a microphone, a speaker, a touch-sensitive panel, a camera, a scanner, one or more user-operable buttons, dials, sliders, switches, or any other type of user interface device.

User interface I/O 54 may be configured to receive input from a user (e.g., physical input, verbal input, etc.) and to provide output to a user in a user-comprehensible format (e.g., text, numbers, words, sounds, status indicators, visual displays, printouts, etc.). For example, a user may interact with user interface I/O 54 to view a list of detected faults for building subsystems 28. BMS controller 24 may monetize each of the detected faults and provide the user with an output (e.g., a visual display, a textual/graphical output, etc.) via user interface I/O 54. In various embodiments, output provided via user interface I/O 54 may include a predicted change in energy consumption associated with each detected fault, a monetary cost of each fault (e.g., on a monthly or yearly basis), an estimated cost to correct each fault (e.g., a repair cost), an indication of whether the repair cost for a fault exceeds the estimated monetary cost of the fault resulting from an increase in energy consumption, a priority with which the faults should be corrected (e.g., a ranking of the faults from most important to least important, an indication of whether each fault is high priority or low priority, etc.).

As another example, a user may interact with user interface I/O 54 to request a performance analysis report for a particular building or building subsystem. BMS controller 24 may process the request and provide the user with an output (e.g., a visual display, a textual/graphical report, etc.) analyzing the performance of the particular building or building subsystem.

In various embodiments, user input may be received locally (e.g., via user interface I/O 54) or remotely (e.g., via a LAN connection, a WAN connection, a network connection, an Internet connection, etc.) from a remote user interface client (e.g., a remote computer, a remote user device, etc.). User output may also be provided locally to a user interacting with BMS controller 24 via user interface I/O 54 or remotely to a user interacting with BMS controller 24 via a remote user interface client (e.g., a remote computer, over a network, etc.). In some embodiments, user input and user output may be sent and received via data communications interface 52, user interface I/O 54, and/or a combination of both data communications interface 52 and user interface I/O 54.

Still referring to FIG. 3B, BMS controller 24 is shown to include a processing circuit 56 including a processor 58 and memory 60. Processor 58 can be implemented as one or more microprocessors (e.g., CPUs, GPUs, etc.), an application specific integrated circuit (ASIC), one or more field programmable gate arrays (FPGAs), a circuit containing one or more processing components, a group of distributed processing components (e.g., processing components in communication via a data network or bus), circuitry for supporting a microprocessor, or other hardware configured for processing data. Processor 58 may be configured to execute computer code stored in memory 60 to complete and facilitate the activities described herein.

Memory 60 may include one or more devices (e.g., RAM, ROM, solid state memory, hard disk storage, etc.) for storing data and/or computer code for completing or facilitating the various processes, layers, and modules of the present disclosure. Memory 60 may include volatile memory or non-volatile memory. Memory 60 may include database components, object code components, script components, or any other type of information structure for supporting the various activities and information structures of the present disclosure. According to an exemplary embodiment, memory 60 is communicably connected to processor 58 via processing circuit 56 and includes computer code for executing (e.g., by processing circuit 56 and/or processor 58) one or more processes described herein. In brief overview, memory 60 is shown to include a building subsystem integration module 62, a weather data module 64, a building control services module 68, a fault detection and diagnostics module 70, a fault prioritization module 72, and a user interface/output module 74.

Still referring to FIG. 3B, memory 60 is shown to include a building subsystem integration module 62. Building subsystem integration module 62 may be configured to manage communications between BMS controller 24 and building subsystems 28. In some embodiments, building subsystem integration module 62 is configured to translate communications (e.g., sensor data, input signals, output signals, etc.) across a plurality of multi-vendor/multi-protocol systems to facilitate data communications between differently protocolled systems and devices. Building subsystem integration module 62 may be a computer function, object, service, or combination thereof configured to drive the conversion of communications between building subsystems 28 and BMS controller 24 (e.g., between HVAC subsystem 30 and lighting subsystem 32, between HVAC subsystem 30 and BMS controller 24, etc.).

Building subsystem integration module 62 may be configured to accommodate multiple communications or data protocols. In some embodiments, building subsystem integration module 62 is configured to conduct the conversion for each protocol based on information stored in memory 60 (e.g., a conversion table, a conversion script, etc.) for each of building subsystems 28 and BMS controller 24. Translation information may be, for example, schema maps or other descriptions of how a message for one protocol should be translated to a message for a second protocol.

Building subsystem integration module 62 may be configured to receive feedback signals from various measurement and other feedback devices of building subsystems 28 (e.g., temperature readings, pressure readings, lighting system states, operating status, security status, etc.) and to provide control signals to various control devices of building subsystems 28 (e.g., dampers, air handling units, chillers, electronic door locks, elevators, etc.). Building subsystem integration module 62 may receive and store energy-related performance data from building subsystems 28. Energy-related performance data may include, for example energy consumption data (e.g., current energy usage, historical energy usage, predicted energy usage, etc.), measured temperatures or other sensory data obtained by one or more sensory devices of building subsystems 28, and/or control parameters (e.g., set points, tuning parameters, threshold values, etc.) used to regulate the temperature or other variables within building 10.

In some embodiments, building subsystem integration module 62 receives pricing data from energy providers and purchasers 44 and/or smart grid 26. Pricing data may include billing data from one or more utilities that supply building 10 with any type of consumable resource. For example, pricing data may include billing data from a utility that provides building 10 with electrical power. In another example, pricing data may include billing data from a utility that supplies water to building 10.

Still referring to FIG. 3B, memory 60 is shown to include a weather data module 64. Weather data module 64 may be the same or similar to weather data module 65. For example, weather data module 64 may obtain and store weather data for one or more geographic locations. For example, weather data may include historical, current, or predicted data regarding a location's temperature (e.g., outside air temperature), humidity, atmospheric pressure, wind speed, precipitable water, or other weather-related data.

In some embodiments, weather data module 64 obtains and stores current weather data whereas weather data module 65 stores historical weather data. In some embodiments, weather data may be gathered via sensors located at or near building 10. Weather data may include weather data from any number of different time periods having any degree of granularity. For example, weather data may identify weather conditions on a monthly, weekly, daily, or hourly level.

Still referring to FIG. 3B, memory 60 is shown to include a building control services module 68. Building control services module 68 may be configured to control BMS 22 or one or more subsystems thereof(e.g., one or more of building subsystems 28) using an energy use model. For example, building control services module 68 may utilize closed loop control, feedback control, PI control, model predictive control, or any other type of automated building control methodology that relies on an energy consumption model to translate an input into an output. In some embodiments, building control services module 68 uses the energy consumption model provided by energy use model module 66 to translate an input received from building subsystems 28 into an output or control signal for building subsystems 28.

Building control services module 68 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via data communications interface 52 and/or user interface I/O 54. In some embodiments, building control services module 66 is configured to communicate (e.g., uni-directionally, bi-directionally, etc.) with smart grid 26 and/or energy providers and purchasers 44 (e.g., a utility, an energy retailer, a group of utilities, an energy broker, etc.). Building control services module 66 may interact with smart grid 26 and/or energy providers and purchasers 44 to exchange price information, demand information, curtailable load calculations (e.g., the amount of load calculated by building control services module 66 to be able to be shed without exceeding parameters defined by the system or user), load profile forecasts, and the like. Building control services module 66 (or an enterprise application 48 or 50 in communication with building control services module 66) may be configured to continuously monitor pricing data provided by utilities/ISOs across the nation, to parse useful information from the monitored data, and to display the useful information to a user to or send the information to other modules of BMS controller 24 (e.g., building subsystem integration module 62, etc.).

Building control services module 68 may apply the various inputs to an energy consumption model to determine an output for one or more building control devices of building subsystems 28 (e.g., dampers, air handling units, chillers, boilers, fans, pumps, etc.) in order to affect a variable state or condition within building 10 (e.g., zone temperature, humidity, air flow rate, etc.). Building control services module 66 may operate BMS 22 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

Still referring to FIG. 3B, memory 60 is shown to include a fault detection and diagnostics (FDD) module 70. FDD module 70 may be configured to provide on-going fault detection for building subsystems 28, subsystem equipment and devices, and control algorithms (e.g., tuning parameters, energy consumption models, etc.) used by building control services module 68. FDD module 70 may receive inputs from building control services module 68, building subsystem integration module 62, or directly from one more building subsystems 28. Inputs received by FDD module 70 may include measured variables, calculated variables, predictor variable values, model parameter values, and/or other values used in the energy consumption model to predict energy consumption.

FDD module 70 may automatically diagnose and respond to detected faults. The responses to detected or diagnosed faults may include providing an alert message to a user, a maintenance scheduling system, or a control algorithm configured to attempt to repair the fault or to work-around the fault. In some embodiments FDD module 70 is configured to provide "fault" events to fault prioritization module 72 for further processing to monetize and prioritize various faults. FDD module 70 may be configured to use statistical analysis of near real-time and/or historical building subsystem data to rapidly identify faults in equipment operation.

FDD module 70 may be configured to store or access a variety of different system data stores (or data points for live data). FDD module 70 may use data from building subsystems 28 to identify faults at the equipment level (e.g., specific chiller, specific AHU, specific terminal unit, etc.) and/or subsystem levels. In some embodiments, FDD module 70 is configured to output a specific identification of the faulty component or cause of the fault (e.g., loose damper linkage) using detailed subsystem inputs available from building subsystem integration module 62.

In some embodiments, FDD module 70 uses a rule-based system (e.g., an expert system) to detect faults in BMS 22. In some embodiments, FDD module 70 is configured to calculate or update performance indices for building subsystems 28 or for individual building equipment devices. Performance indices may be calculated based on exponentially-weighted moving averages (EWMAs) to provide statistical analysis features which allow outlier and statistical process control (SPC) techniques to be used to identify faults. For example, FDD module 70 may be configured to use a history of energy consumption data (e.g., metered and/or billed energy consumption) to determine when energy consumption becomes abnormal.

In some embodiments, FDD module 70 detects a fault by monitoring various parameters of the energy consumption model maintained by energy use model module 66. Model parameters may have target values or baseline values in the absence of a fault (e.g., under normal operation of BMS 22). Faults in the building equipment can cause the model parameters to deviate from the target values. In some embodiments, a fault is defined by a deviation in one or more of the model parameters from the target value or values by an amount exceeding a fault threshold. The fault threshold may define a window of parameter values around the target value. For example, the fault threshold may be a percentage of the target value, an upper threshold, a lower threshold, an adaptive threshold, a static threshold, or any other threshold defined by threshold criteria.

FDD module 70 may be configured to identify the target values for each of the monitored model parameters. FDD module 70 may determine whether any of the monitored model parameters deviate from their respective target values by an amount exceeding the fault threshold. If a model parameter deviates from the target value by an amount exceeding the fault threshold, FDD module 70 may identify a fault condition (i.e., a detected fault) with respect to the model parameter.

When a fault is detected, FDD module 70 may generate one or more alarms or events to prompt manual fault diagnostics or to initiate an automatic fault diagnostics activity via an automated fault diagnostics routine. The automated fault diagnostics routine may use energy consumption data, weather data, model data (e.g., performance models based on historical building equipment performance), building subsystem data, performance indices, or other data made available by building subsystem integration module to complete its fault diagnostics activities.

In an exemplary embodiment, when a fault is detected, FDD module 70 is configured to investigate the fault by initiating expanded data logging and error detection/diagnostics activities relative to the inputs, outputs, and systems related to the fault. For example, FDD module 70 may be configured to poll sensors associated with an air handling unit (AHU) (e.g., temperature sensors for the space served by the AHU, air flow sensors, position sensors, etc.) on a frequent or more synchronized basis to better diagnose the source of a detected AHU fault.

FDD module 70 may further be configured to compute residuals (differences between measured and expected values) for analysis to determine the fault source. For example, FDD module 70 may be configured to implement processing circuits or methods described in U.S. patent application Ser. No. 12/487,594, filed Jun. 18, 2009, titled "Systems and Methods for Fault Detection of Air Handling Units," the entirety of which is incorporated herein by reference. FDD module 70 can use a finite state machine and input from system sensors (e.g., temperature sensors, air mass sensors, etc.) to diagnose faults. State transition frequency (e.g., between a heating state, a free cooling state, and a mechanical cooling state) may also be used by FDD module 70 to identify and diagnose unstable control issues. FDD module 70 may also or alternatively be configured for rule-based predictive detection and diagnostics (e.g., to determine rule thresholds, to provide for continuous monitoring and diagnostics of building equipment).

In addition to or as an alternative to an automated diagnostics process, FDD module 70 can drive a user through a manual diagnostic process. The manual diagnostic process may utilize graphical or textual user interfaces displayed to a user to receive feedback or input from a user. In some embodiments FDD module 70 will provide a number of possible reasons for a fault (e.g., determined or estimated) to the user via a GUI. The user may select one of the faults for manual investigation or calculation.

FDD module 70 may be configured to determine a most likely root cause of a detected fault. Once a cause is detected or estimated, FDD module 70 can provide a visualization of the fault, its root cause, and/or recommended actions for assessment to a user via a GUI. Fault information (including determined or estimated fault causes) can also be provided to a service management system and/or a work dispatch service for action.

In some embodiments, FDD module 70 provides fault detection and diagnostic results to User interface/output module 74. Monitoring and reporting applications 48 can then access the data such that real time "system health" dashboards can be viewed and navigated by a user (e.g., a building engineer). For example, monitoring and reporting applications 48 may include a web-based monitoring application that includes several graphical user interface (GUI) elements (e.g., widgets, dashboard controls, windows, etc.) for displaying key performance indicators (KPI) or other information to users of a GUI using information or analyses provided by FDD module 70. In addition, the GUI elements may summarize relative energy use and intensity across different buildings (real or modeled), different campuses, or the like. Other GUI elements or reports may be generated and shown based on available data that allow facility managers to assess performance across a group of buildings from one screen. The user interface or report (or underlying data engine) may be configured to aggregate and categorize faults by building, building type, equipment type, fault type, times of occurrence, frequency of occurrence, severity, and the like. The GUI elements may include charts or histograms that allow the user to visually analyze the magnitude of occurrence of specific faults or equipment for a building, time frame, or other grouping.

Still referring to FIG. 3B, memory 60 is shown to include a fault prioritization module 72. Fault prioritization module 72 may be run in an online environment to automatically prioritize detected faults. The prioritization may be used by user interface/output module 74 to determine which faults to communicate to a human user via a dashboard or other GUI. The prioritization can also be used to determine which faults are worthy of immediate investigation or which faults should be investigated during regular servicing rather than a special work request. Fault prioritization module 72 may be configured to determine a priority for a fault (e.g., a priority relative to other faults, an urgency with which the fault should be corrected, etc.) based on an estimated change in energy consumption and/or an estimated financial impact of the fault.

The methodology used by fault prioritization module 72 to monetize and prioritize faults provides several advantages over previous fault prioritization techniques. For example, the parameter-specific regression models developed by energy cost regression model generator 90 allow fault prioritization module 72 to predict the cost of a fault for various degrees of the same fault (e.g., a damper being completely stuck vs. a damper that is slow to respond). Different degrees of the same fault may be characterized and/or detected based on an amount by which the parameter deviates from the target value for the parameter.

Still referring to FIG. 3B, fault prioritization module 72 is shown to include a regression model retrieval module 84, an energy consumption estimator module 98, and a fault monetization module 82. When a fault is detected by FDD module 70, regression model retrieval module 84 may identify a parameter of the energy consumption model that is affected by the fault (i.e., the "fault parameter"). In various embodiments, identifying the fault parameter may be performed by regression model retrieval module 84, fault monetization module 82 and/or FDD module 70.

In some embodiments, a fault is defined by a deviation in a model parameter from the target value for the parameter by an amount exceeding a fault threshold. The fault threshold may define a window of parameter values around the target value. For example, the fault threshold may be a percentage of the target value, an upper threshold, a lower threshold, an adaptive threshold, a static threshold, or any other threshold defined by threshold criteria. In some embodiments, identifying the fault parameter includes identifying a parameter of the energy consumption model that deviates from the target value for the parameter by an amount exceeding the fault threshold.

Regression model retrieval module 84 may retrieve the regression model and/or regression model coefficients associated with the identified fault parameter from energy cost regression model database 92. Regression model retrieval module 84 may identify a $\Delta x$ value to use in the regression model by comparing the current value of the fault parameter (e.g., $x_{1,a}$) with the target value for the fault parameter (e.g., $x_{1,0}$). Regression model retrieval module 84 may use the difference between the current value of the fault parameter and the target value of the fault parameter as the value for $\Delta x$ in the regression model (e.g., $\Delta x_{1,a} = x_{1,a} - x_{1,0}$).

If the regression model is a multivariate regression model, regression model retrieval module 84 may identify a value of the $OAX_{avg}$ weather parameter. The $OAX_{avg}$ weather parameter may be stored in weather data module 64 and retrieved from weather data module 64 by regression model retrieval module 84 for use in calculating the change in energy consumption $\Delta y$ (e.g., $\Delta y = \beta_1 + \beta_2 \Delta x + \beta_3 OAX_{avg}$).

Still referring to FIG. 3B, fault prioritization module 72 is shown to include an energy consumption estimator module 98. Energy consumption estimator module 98 may use the energy cost regression model for the identified fault parameter to calculate an estimated change in energy consumption (i.e., a $\Delta y$ value) resulting from the fault. In some embodiments, energy consumption estimator module 98 calculates a value for the change in energy consumption $\Delta y$ predicted by the energy cost regression model as a function of the $\Delta x$ variable (i.e., the difference between the current value of the fault parameter and the target value of the fault parameter), the regression model coefficients, and, in some implementations, the weather parameter $OAX_{avg}$.

Energy consumption estimator module 98 may calculate an estimated change in energy consumption for each of the faults detected by FDD module 70. In some embodiments, the estimated change in energy consumption $\Delta y$ is expressed as an energy consumption per unit area (e.g., $J/m^2$). Energy consumption estimator module 98 may multiply the estimated change in energy consumption $\Delta y$ by the area of building 10 or the area of a portion of building 10 that is affected by the fault (e.g., the area of one or more building zones or rooms) using one of the following equations:

$$\text{Energy} = \Delta y \cdot \text{Area} = (\beta_1 + \beta_2 \Delta x) \cdot \text{Area}$$

$$\text{Energy} = \Delta y \cdot \text{Area} = (\beta_1 + \beta_2 \Delta x + \beta_3 OAX_{avg}) \cdot \text{Area}$$

where the value of the variable "Energy" represents the change in total energy consumption expected to result from the fault.

Still referring to FIG. 3B, fault prioritization module 72 is shown to include a fault monetization module 82. Fault monetization module 82 may be configured to monetize and prioritize various faults based on the change in energy consumption $\Delta y$ associated with each fault.

In some embodiments, fault monetization module 82 uses the estimated change in energy consumption to determine a monetary cost of a detected fault. Fault monetization module 82 may obtain energy pricing information from smart grid 26 and/or energy providers and purchasers 44 to calculate the monetary cost of the increase in energy consumption. For example, fault monetization module 82 may multiply the increase in energy consumption associated with the fault by the cost of energy. Fault monetization module 82 may determine a monetary cost of the fault due to an increase in energy consumption for a period of time (e.g., cost per day, cost per month, cost per year, etc.).

In some embodiments, fault monetization module 82 uses other types of cost information (e.g., replacement costs, service costs, etc.) in conjunction with the energy cost information to monetize a fault. For example, fault monetization module 82 may compare the monetary cost of correcting a fault with the ongoing energy cost associated with the fault to determine whether it would be cost effective to correct a detected fault (e.g., if the monetary cost associated with a fault exceeds the repair cost) or whether correcting the fault would cost more than the increase in energy consumption attributable to the fault. Fault monetization module 82 may use the energy cost information and/or repair cost information to determine a fault correction priority (e.g., correcting faults that have the highest energy consumption or monetary cost first, correcting faults that have the highest return on investment first, etc.).

In some embodiments, fault monetization module 82 is configured to compare the regression model coefficients $\beta_2$ for various regression models (i.e., the regression models developed for each fault parameter) to determine which faults have the highest priority. Since the regression model coefficient $\beta_2$ is multiplied by the change in the fault parameter $\Delta x$ in the regression model (i.e., $\Delta y = \beta_1 + \beta_2 \Delta x$), the magnitude of the $\beta_2$ coefficient may indicate which faults result in the greatest change in energy consumption. For example, a regression model having a relatively small $\beta_2$ coefficient may indicate that the corresponding fault parameter has a lesser impact on energy consumption than a fault parameter associated with a regression model that has a larger $\beta_2$ coefficient. In some embodiments, fault monetization module 82 is configured to prioritize faults corresponding to regression models that have larger $\beta_2$ coefficients over faults corresponding to regression models that have smaller $\beta_2$ coefficients.

Fault monetization module 82 may be configured to generate a report for supporting operational decisions and capital requests. The report may include the cost of allowing faults to persist, energy wasted due to the fault, potential cost to fix the fault (e.g., based on a service schedule), or other overall metrics such as overall subsystem or building reliability (e.g., compared to a benchmark).

Still referring to FIG. 3C, memory 60 is shown to include a user interface/output module 74. User interface/output module 74 may be configured to generate an output for presentation to a user. User interface/output module 74 may generate a graphical display, a visual display, a textual display, or any other type of user-comprehensible output. User interface/output module 74 may communicate a result of a user query/request (e.g., a system status request, a request for an analytical report, etc.), a result of an intermediate processing step (e.g., a regression parameter or change in energy consumption value, etc.), a result of a performance analysis, a result of a fault detection analysis, or any other data stored or used BMS 22. In various embodiments, user interface/output module 74 may generate display data for presentation via a local display (e.g., to a local user interacting with BMS controller 24 via user interface I/O 54), or may communicate output data to a remote user via data communications interface 52 (e.g., a user interacting with BMS controller 24 via a network connection and/or a remote client).

User interface/output module 74 may be configured to provide a visualization of one or more detected faults, root causes of the detected faults, the priority of various faults, the energy cost of detected faults, the monetary cost of detected faults, the repair cost of detected faults, and/or recommended actions for assessment to a user via a GUI. Fault information (including determined or estimated fault causes) can also be provided to a service management system and/or a work dispatch service for action.

In some embodiments, user interface/output module 74 interacts with monitoring and reporting applications 48 to generate and present system status information to a user or diagnostic system. For example, user interface/output module 74 may interact with monitoring and reporting applications to generate and present real time system health dashboards that can be viewed and navigated by a user (e.g., a building engineer). Monitoring and reporting applications 48 may include a web-based monitoring application that includes several graphical user interface (GUI) elements (e.g., widgets, dashboard controls, windows, etc.) for displaying key performance indicators (KPI) or other information to users of a GUI. In addition, the GUI elements may summarize relative energy use and intensity across different buildings (real or modeled), different campuses, or the like. Other GUI elements or reports may be generated and shown based on available data that allow facility managers to assess performance across a group of buildings from one screen. The user interface or report (or underlying data engine) may be configured to prioritize and monetize faults, categorize faults by building, building type, equipment type, fault type, times of occurrence, frequency of occurrence, severity, and the like. The GUI elements may include charts or histograms that allow the user to visually analyze the magnitude of occurrence of specific faults or equipment for a building, time frame, or other grouping.

User interface/output module 74 may be configured to conduct a priority-based suppression of faults (e.g., suppressed relative to a user interface, suppressed relative to further diagnostics, etc.). For example, user interface/output module 74 may suppress faults that have a lower priority (e.g., lower estimated energy consumption, lower monetary value, lower $\beta_2$ parameter value, etc.) in favor of faults that have a higher priority.

Referring now to FIG. 3C, a block diagram illustrating an alternative implementation in which BMS controller 24 includes the functionality of energy cost regression model generator 90 is shown, according to an exemplary embodiment. In FIG. 3C, BMS controller 24 is shown to include several memory modules which were described in FIG. 3B as components of energy cost regression model generator 90. For example, BMS controller 24 is shown to include energy model module 66, parameter modulation module 76, an energy consumption estimator module 78, and regression model module 80. These memory modules may perform the same or similar functions as previously described with reference to FIG. 3B. In some embodiments, BMS controller 24 is configured to generate energy cost regression models (e.g., in an offline or online environment), detect faults, and use the energy cost regression models to prioritize and/or monetize the detected faults.

Still referring to FIG. 3C, BMS controller 24 is shown to include a data communications interface 52, a user interface I/O 54, and a processing circuit 56. Data communications interface 52 and user interface I/O 54 may be the same or similar as previously described with reference to FIG. 3B. Processing circuit 56 may also be similar or the same as previously described with the exception that memory 60 is shown to include several additional memory modules configured to perform the functions of energy cost regression model generator 90. For example, in FIG. 3C, memory 60 is shown to include energy model module 66, parameter modulation module 76, energy consumption estimator module 78, and regression model module 80. The functionality of these memory modules in the integrated embodiment illustrated in FIG. 3C is described below.

In the embodiment shown in FIG. 3C, parameter modulation module 76 may be configured to modulate (e.g., variably adjust, increase, decrease, alter, change, etc.) a parameter $x_i$ of the energy consumption model provided by energy use model module 66. In some embodiments, parameter modulation module 76 individually modulates multiple different parameters of the energy consumption model while maintaining the other model parameters at their target values. For example, parameter modulation module 76 may set the parameter $x_1$ to multiple different values (e.g., $x_{1,0}$, $x_{1,1}, \ldots, x_{1,n}$) while holding the other model parameters at their target values (e.g., $x_{2,0}$, $x_{3,0}$, $x_{4,0}$, etc.). In other embodiments, parameter modulation module 76 may modulate two or more parameters together (e.g., for implementations in which a single fault can affect multiple parameters simultaneously).

Parameter modulation module 76 may be configured to generate a first set of variables for each modulated parameter $x_i$ of the energy consumption model. The first set of variables may include multiple differences (i.e., $\Delta x$ variables) between the adjusted value of the modulated parameter and the target value of the modulated parameter at each of the multiple different values for the modulated parameter. For example, if $x_1$ is the modulated parameter, parameter modulation module 76 may generate a set of $\Delta x_1$ variables, each of which is a difference between the target value of the $x_1$ parameter (i.e., $x_{1,0}$) and one of the adjusted values of the $x_1$ parameter (e.g., $\Delta x_{1,1} = x_{1,1} - x_{1,0}$, $\Delta x_{1,2} = x_{1,2} - x_{1,0}$, etc.). The $\Delta x$ variables may be positive or negative depending on whether the adjusted value of the modulated parameter is greater than or less than the target value. Each of the $\Delta x$ variables may represent a change in the modulated parameter from the baseline or target value under normal operating conditions (e.g., in the absence of a fault).

In the embodiment shown in FIG. 3C, energy consumption estimator module 78 may be configured to predict an energy consumption at each of the multiple different values of the modulated parameter. Energy consumption estimator module 78 may use the energy consumption model provided by energy model module 66 to calculate the predicted energy consumption. In some embodiments, energy consumption estimator module 78 sets each of the parameters of the energy consumption model to their target values (i.e., $x_{1,0}, \ldots, x_{n,0}$) to calculate a baseline energy consumption. For example, energy consumption estimator module 78 may determine a baseline energy consumption $\hat{y}_0$ using the target values of the model parameters as inputs to the energy consumption model:

$$\hat{y}_0 = f(x_{1,0}, x_{2,0}, x_{3,0}, \ldots x_{m,0})$$

where $\hat{y}_0$ is the baseline energy consumption and the "comma-zero" notation indicates that each of the model parameters $x_i$ is at its target value (i.e., $x_{1,0}$, $x_{2,0}$, etc.).

Energy consumption estimator module 78 may be configured to replace a modulated parameter $x_i$ of the energy consumption model with each of the multiple adjusted values of the modulated parameter (e.g., $x_{i,1}$, $x_{i,2}$, ..., $x_{i,n}$) and to calculate an estimated energy consumption (e.g., $\hat{y}_{i,1}$, $\hat{y}_{i,2}$, ..., $\hat{y}_{i,n}$) with the modulated parameter at each of the multiple adjusted values. For example, if $x_1$ is the modulated parameter, energy consumption estimator module 78 may be configured to replace the target parameter $x_{1,0}$ with each of the multiple adjusted values for the $x_1$ parameter (i.e., $x_{1,1}$, $x_{1,2}$, $x_{1,3}$, ..., $x_{1,n}$). In some embodiments, energy consumption estimator module 78 replaces the modulated parameter while maintaining the other model parameters at their target values.

For each of the multiple adjusted values of the modulated parameter, energy consumption estimator module 78 may calculated an estimated energy consumption value. For example, energy consumption estimator module 78 may calculate a first estimated energy consumption value $\hat{y}_{1,1}$ by setting the modulated parameter $x_1$ to the first adjusted value $x_{1,1}$ as shown in the following equation:

$$\hat{y}_{1,1} = f(x_{1,1}, x_{2,0}, x_{3,0}, \ldots, x_{m,0})$$

Energy consumption estimator module 78 may repeat this process for each of the n multiple values of the modulated parameter, estimating n energy consumption values as shown in the following equations:

$$\hat{y}_{1,2} = f(x_{1,2}, x_{2,0}, x_{3,0}, \ldots, x_{m,0})$$

$$\hat{y}_{1,3} = f(x_{1,3}, x_{2,0}, x_{3,0}, \ldots, x_{m,0})$$

$$\vdots$$

$$\hat{y}_{1,n} = f(x_{1,n}, x_{2,0}, x_{3,0}, \ldots, x_{m,0})$$

Energy consumption estimator module 78 may repeat the parameter replacement and estimation process for each of the modulated parameters $x_1 \ldots x_m$, estimating multiple energy consumption values for each modulated parameter. For example, energy consumption estimator module 78 may estimate multiple energy consumption values (i.e., $\hat{y}_{1,1}$, $\hat{y}_{1,2}$, $\hat{y}_{1,3}$, ..., $\hat{y}_{1,n}$) for the $x_1$ parameter using the multiple adjusted values of the $x_1$ parameter (i.e., $x_{1,1}$, $x_{1,2}$, $x_{1,3}$, ..., $x_{1,n}$) as inputs to the energy consumption model. Energy consumption estimator module 78 may estimate multiple energy consumption (i.e., $\hat{y}_{2,1}$, $\hat{y}_{2,2}$, $\hat{y}_{2,3}$, ..., $\hat{y}_{2,n}$) values for the $x_2$ parameter using the multiple adjusted values of the $x_2$ parameter (i.e., $x_{2,1}$, $x_{2,2}$, $x_{2,3}$, ..., $x_{2,n}$) as inputs to the energy consumption model. Energy consumption estimator module 78 may estimate multiple energy consumption values for each remaining modulated parameter of the energy consumption model.

Energy consumption estimator module 78 may be configured to generate a second set of variables for each modulated parameter $x_i$ of the energy consumption model. The second set of variables may include multiple differences (i.e., $\Delta y$ variables) between the baseline energy consumption value $y_{i,0}$ and one of the estimated energy consumption values (e.g., $\Delta y_{i,1} = \hat{y}_{i,1} - \hat{y}_{i,0}$, $\Delta_{i,2} = \hat{y}_{i,2} - \hat{y}_{i,0}$, $\Delta y_{i,3} = \hat{y}_{i,3} - \hat{y}_{i,0}$, etc.) for a particular fault parameter. The $\Delta y$ variables may be positive or negative depending on whether the estimated energy consumption value is greater than or less than the baseline value. Each of the $\Delta y$ variables may represent a change in the energy consumption attributable to a fault relative to the baseline energy consumption under normal operating conditions (e.g., in the absence of a fault). Energy consumption estimator module 78 may generate a different set of $\Delta y$ variables for each modulated parameter.

In the embodiment shown in FIG. 3C, fault monetization module 82 may be configured to monetize and prioritize various faults using the regression models developed by regression model module 80. Fault monetization module 82 may run in an online environment to prioritize and monetize actual faults detected by FDD module 70. For example, when a fault is detected by FDD module 70, fault monetization module 82 may identify a parameter of the energy consumption model that is affected by the fault (i.e., the "fault parameter"). In some embodiments, a fault is defined by a deviation in a model parameter from the target value for the parameter by an amount exceeding a fault threshold. The fault threshold may define a window of parameter values around the target value. For example, the fault threshold may be a percentage of the target value, an upper threshold, a lower threshold, an adaptive threshold, a static threshold, or any other threshold defined by threshold criteria. In some embodiments, identifying the fault parameter includes identifying a parameter of the energy consumption model that deviates from the target value for the parameter by an amount exceeding the fault threshold. In various embodiments, identifying the fault parameter may be performed by fault monetization module 82 and/or FDD module 70.

Fault monetization module 82 may retrieve the regression model associated with the fault parameter from the data storage device in which the regression models are stored. Fault monetization module 82 may identify a $\Delta x$ value to use in the regression model by comparing the current value of the fault parameter with the target value for the fault parameter. Fault monetization module 82 may use the difference between the current value of the fault parameter and the target value of the fault parameter as the value of $\Delta x$ in the regression model.

If the regression model is a multivariate regression model, fault monetization module 82 may identify a value of the $OAX_{avg}$ weather parameter. The $OAX_{avg}$ weather parameter may be stored in weather data module 64 and retrieved from weather data module 64 by fault monetization module 82 for use in the regression model. Fault monetization module 82 may calculate a value for the change in energy consumption $\Delta y$ predicted by the regression model as a function of the $\Delta x$ value, the regression model coefficients, and, in some implementations, the weather parameter $OAX_{avg}$.

Fault monetization module 82 may calculate an estimated change in energy consumption for each of the faults detected by FDD module 70. In some embodiments, the estimated change in energy consumption $\Delta y$ is expressed as an energy consumption per unit area (e.g., $J/m^2$). Fault monetization module 82 may multiply the estimated change in energy consumption $\Delta y$ by the area of building 10 or the area of a portion of building 10 that is affected by the fault (e.g., the area of one or more building zones or rooms) using one of the following equations:

$$\text{Energy} = \Delta y \cdot \text{Area} = (\beta_1 + \beta_2 \Delta x) \cdot \text{Area}$$

$$\text{Energy} = \Delta y \cdot \text{Area} = (\beta_1 + \beta_2 \Delta x + \beta_3 OAX_{avg}) \cdot \text{Area}$$

where the value of the variable "Energy" represents the change in total energy consumption expected to result from the fault.

In some embodiments, fault monetization module 82 uses the estimated change in energy consumption to determine a monetary cost of a detected fault. Fault monetization module 82 may obtain energy pricing information from smart grid 26 and/or energy providers and purchasers 44 to calculate the monetary cost of the increase in energy consumption. For example, fault monetization module 82 may multiply the increase in energy consumption associated with the fault by the cost of energy. Fault monetization module 82 may determine a monetary cost of the fault due to an increase in energy consumption for a period of time (e.g., cost per day, cost per month, cost per year, etc.).

In some embodiments, fault monetization module 82 uses other types of cost information (e.g., replacement costs, service costs, etc.) in conjunction with the energy cost information to monetize a fault. For example, fault monetization module 82 may compare the monetary cost of correcting a fault with the ongoing energy cost associated with the fault to determine whether it would be cost effective to correct a detected fault (e.g., if the monetary cost associated with a fault exceeds the repair cost) or whether correcting the fault would cost more than the increase in energy consumption attributable to the fault. Fault monetization module 82 may use the energy cost information and/or repair cost information to determine a fault correction priority (e.g., correcting faults that have the highest energy consumption or monetary cost first, correcting faults that have the highest return on investment first, etc.).

In some embodiments, fault monetization module 82 is configured to compare the regression model coefficients $\beta_2$ for various regression models (i.e., the regression models developed for each fault parameter) to determine which faults have the highest priority. Since the regression model coefficient $\beta_2$ is multiplied by the change in the fault parameter $\Delta x$ in the regression model (i.e., $\Delta y = \beta_1 + \beta_2 \Delta x$), the magnitude of the $\beta_2$ coefficient may indicate which faults result in the greatest change in energy consumption. For example, a regression model having a relatively small $\beta_2$ coefficient may indicate that the corresponding fault parameter has a lesser impact on energy consumption than a fault parameter associated with a regression model that has a larger $\beta_2$ coefficient. In some embodiments, fault monetization module 82 is configured to prioritize faults corresponding to regression models that have larger $\beta_2$ coefficients over faults corresponding to regression models that have smaller $\beta_2$ coefficients.

Fault monetization module 82 may be configured to generate a report for supporting operational decisions and capital requests. The report may include the cost of allowing faults to persist, energy wasted due to the fault, potential cost to fix the fault (e.g., based on a service schedule), or other overall metrics such as overall subsystem or building reliability (e.g., compared to a benchmark).

Figure 4:
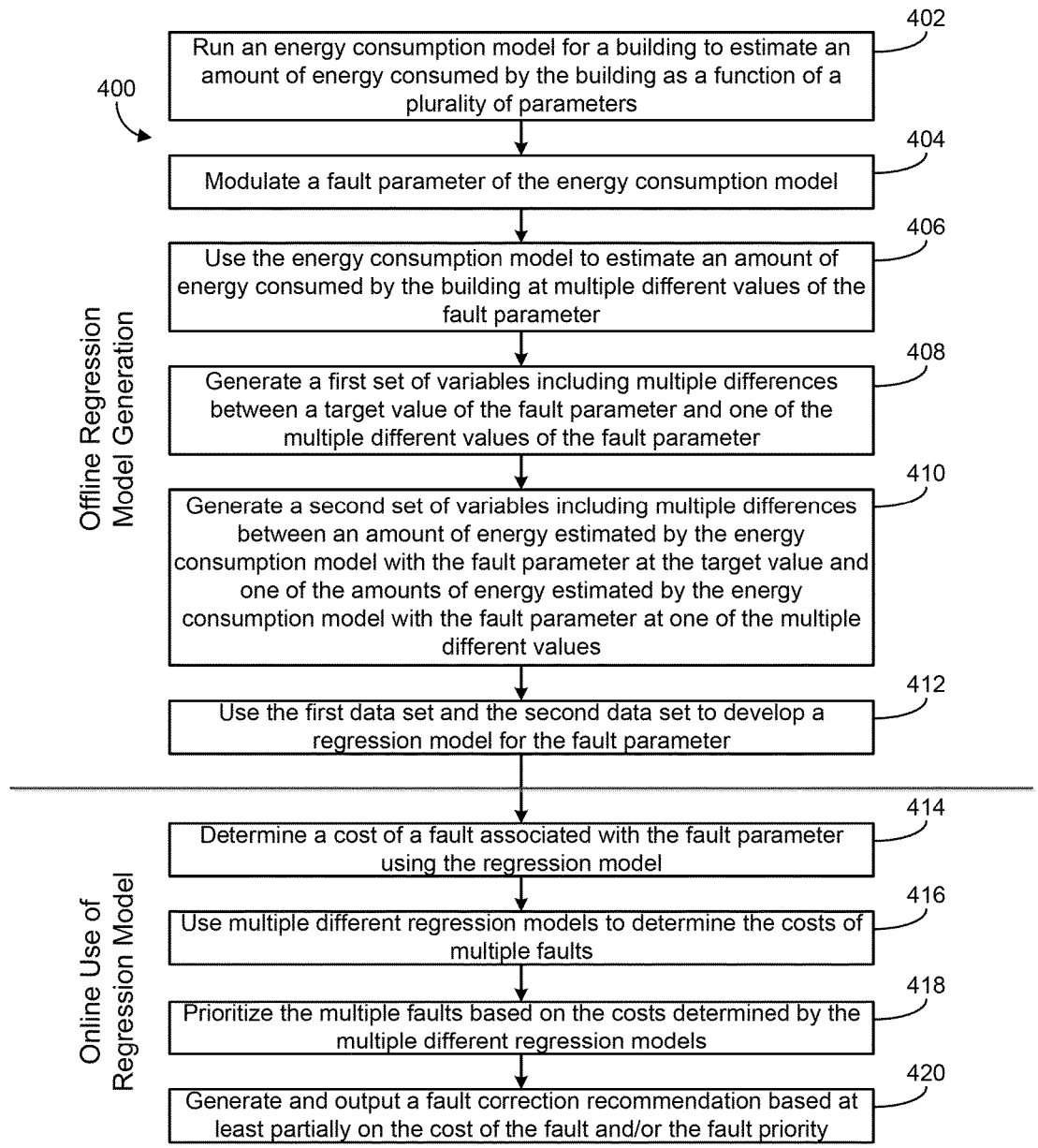
FIG. 4 is a flowchart of a process that may be performed by the building management system of FIG. 1 to prioritize and monetize faults, according to an exemplary embodiment.

Referring now to FIG. 4 a flowchart of a process 400 for prioritizing and monetizing building faults is shown, according to an exemplary embodiment. Process 400 may be used to develop energy cost models (e.g., regression models) for multiple different fault parameters. Each of the energy cost models can be used estimate a change in energy consumption resulting from a change in one of the fault parameters. When a fault is detected in the building, process 400 can be used to estimate an energy cost and/or monetary cost associated with the fault using one of the energy cost models. Multiple faults can be prioritized and corrected based on the costs associated therewith.

In some embodiments, process 400 is performed by energy cost regression model generator 90 and/or BMS controller 24 using one or more memory modules thereof, as described with reference to FIGS. 3B-3C. In the implementation shown in FIG. 3B, steps 402-412 may be performed by energy cost regression model generator 90 in an offline environment to generate one or more regression models and/or regression model coefficients. Steps 414-420 may be performed by BMS controller 24 in an online environment to prioritize and/or monetize detected faults using the regression models generated in steps 402-412. In the alternative implementation shown in FIG. 3C, all of steps 402-420 may be performed by BMS controller 24.

Process 400 is shown to include running an energy consumption model for a building to estimate an amount of energy consumed by the building as a function of a plurality of parameters (step 402). The energy consumption model can apply to building 10 or BMS 22 as a whole (e.g., a whole building energy consumption model) or to an individual subsystem of BMS 22 (e.g., HVAC subsystem 30, lighting subsystem 32, fire safety subsystem 36, etc.).

In some embodiments, step 402 includes running a simulation model (e.g., an EnergyPlus) model to estimate the energy consumption of building 10 and/or BMS 22 as a function of multiple model parameters. Model parameters can be physical parameters (e.g., building type, building materials, HVAC system components, etc.), control parameters (e.g., controller setpoints, tuning parameters, operating schedule, etc.), measured parameters (e.g., measured flow rates, measured damper positions, etc.), or other parameters which affect the energy consumption of a building or building system.

In some embodiments, the energy consumption model uses one or more predictor variables to estimate the building energy consumption. Predictor variables may include, for example, weather-related predictor variables (e.g., outside air temperature, outside air enthalpy, etc.) and other predictor variables which have an effect on the building energy consumption (e.g., building static pressure, air flow rate, water consumption, building occupancy, etc.). The energy consumption model may incorporate or use one or more equations representing physical principles (e.g., heat transfer principles, thermodynamic principles, etc.) to estimate the building energy consumption as a function of the model parameters and/or predictor variables.

The energy consumption model run in step 402 may be of any form. In some embodiments, the energy consumption model is an energy simulation model such as an EnergyPlus model or other similar simulation-based model. In other embodiments, the energy consumption model may be a parametric model (e.g., linear regression models, non-linear regression models, etc.), a non-parametric model (neural networks, kernel estimation, hierarchical Bayesian, etc.), or something in between (e.g., Gaussian process models). In some embodiments, step 402 includes receiving the energy consumption model via data communications interface 52 and/or user interface U/O 54. In other embodiments, step 402 includes generating the energy consumption model using building and/or weather data (e.g., data from building subsystem integration module 62 and/or weather data module 64).

In various embodiments, the energy consumption model may be run locally or remotely. In some embodiments, step 402 includes accessing a remotely-stored energy consumption model (e.g., via a data connection, a user interface, etc.) to estimate the building energy consumption. For example, step 402 may include providing an interface through which model parameters can be specified and provided as inputs to the energy consumption model. The model parameters may be specified by a user or generated automatically by parameter modulation module 76.

Model parameters may have target values. A target value for a parameter may be a baseline value that the parameter is expected to have under normal operation of BMS 22 (e.g., in the absence of a fault). Faults in the building equipment can cause the model parameters to deviate from the target values. In some embodiments, a fault is defined by a deviation in one or more of the model parameters from the target value or values by an amount exceeding a fault threshold.

Still referring to FIG. 4, process 400 is shown to include modulating a fault parameter of the energy consumption model (step 404). A fault parameter may be any parameter of the energy consumption model that can be affected by a fault in the building (e.g., a fault in BMS 22 or a subsystem thereof, a fault in the building equipment, etc.). Step 404 may include modulating (e.g., variably adjusting, increasing, decreasing, altering, changing, etc.) a parameter of the energy consumption model run in step 402. In some embodiments, the energy consumption model run in step 402 is used to calculate an estimated energy consumption $\hat{y}$ as a function of a plurality of model parameters $x_1, \ldots, x_m$. For example, the energy consumption model may have the form:

$$\hat{y}=f(x_1, \ldots, x_m)$$

where $\hat{y}$ is the energy consumption estimated by the model (e.g., in Joules, in Joules per unit area, etc.), and $x_1 \ldots x_m$ are model parameters (e.g., parameters of the physical simulation model, building-specific attributes, measured or calculated parameters such as an air handling unit (AHU) outlet temperature, a variable air volume device (VAV) outlet temperature, building static pressure, air flow rate, etc.)

Step 404 may include individually modulating one or more of the model parameters $x_1, \ldots, x_n$. In some embodiments, step 404 includes individually modulating each parameter of the energy consumption model while maintaining the other model parameters at their target values. For example, step 404 may include adjusting the parameter $x_1$ to multiple different values (e.g., $x_{1,0}$, $x_{1,1}$, $x_{1,2}, \ldots, x_{1,n}$) while holding the other model parameters at their target values (e.g., $x_{2,0}, x_{3,0}, \ldots, x_{m,0}$). In other embodiments, step 404 may include modulating two or more parameters together (e.g., for implementations in which a single fault can affect multiple parameters simultaneously).

Still referring to FIG. 4, process 400 is shown to include using the energy consumption model to estimate an amount of energy consumed by the building at multiple different values of the fault parameter (step 406). In some embodiments, step 406 includes setting each of the parameters of the energy consumption model to their target values to calculate a baseline energy consumption. For example, step 406 may include determining a baseline energy consumption $\hat{y}_0$ using the energy use model:

$$\hat{y}_0=f(x_{1,0},x_{2,0},x_{3,0}, \ldots ,x_{m,0})$$

where $\hat{y}_0$ is the baseline energy consumption and the "comma-zero" notation indicates that each of the model parameters is at its target value (i.e., $x_{1,0}, x_{2,0}, x_{3,0}$, etc.).

Step 406 may include replacing the modulated parameter of the energy consumption model with each of the multiple adjusted values and to calculate an estimated energy consumption with the modulated parameter at each of the multiple adjusted values. For example, if $x_1$ is the modulated parameter, step 406 may include replacing the target parameter $x_{1,0}$ with each of the multiple adjusted values for the target parameter (i.e., $x_{1,1}, x_{1,2}, x_{1,3}, \ldots, x_{1,n}$). In some embodiments, energy consumption step 406 includes replacing the modulated parameter while maintaining the other model parameters at their target values.

For each of the multiple adjusted values of the modulated parameter, step 406 may include calculating an estimated energy consumption value. For example, for the model parameter $x_1$, step 406 may include calculating a first estimated energy consumption value $\hat{y}_{1,1}$ by setting the modulated parameter $x_1$ to the first adjusted value $x_{1,1}$ as shown in the following equation:

$$\hat{y}_{1,1}=f(x_{1,1},x_{2,0},x_{3,0}, \ldots ,x_{m,0})$$

Step 406 may be repeated for each of the n multiple values of the modulated parameter, estimating n energy consumption values as shown in the following equations:

$$\hat{y}_{1,2} = f(x_{1,2}, x_{2,0}, x_{3,0}, \ldots , x_{m,0})$$

$$\hat{y}_{1,3} = f(x_{1,3}, x_{2,0}, x_{3,0}, \ldots , x_{m,0})$$

$$\vdots$$

$$\hat{y}_{1,n} = f(x_{1,n}, x_{2,0}, x_{3,0}, \ldots , x_{m,0})$$

Steps 404 and 406 can be repeated for multiple different fault parameters to estimate multiple energy consumption values for each fault parameter. For example, steps 404 and 406 can be performed a first time to estimate multiple energy consumption values for the $x_1$ parameter using the multiple adjusted values of the $x_1$ parameter (i.e., $x_{1,1}$, $x_{1,2}$, $x_{1,3}, \ldots, x_{1,n}$). Steps 404 and 406 can be performed a second time to estimate multiple energy consumption values for the $x_2$ parameter using the multiple adjusted values of the $x_2$ parameter (i.e., $x_{2,1}, x_{2,2}, x_{2,3}, \ldots, x_{2,n}$). Steps 404 and 406 can be repeated multiple times to estimate multiple energy consumption values for each remaining fault parameter of the energy consumption model.

Still referring to FIG. 4, process 400 is shown to include generating a first set of variables including multiple differences (i.e., Δx variables) between a target value of the fault parameter and one of the multiple different values of the fault parameter (step 408). For example, if $x_1$ is the fault parameter, step 408 may include generating a set of $\Delta x_1$ variables, each of which is a difference between the target value of the $x_1$ parameter (i.e., $x_{1,0}$) and one of the adjusted values of the $x_1$ parameter (e.g., $\Delta x_{1,1}=x_{1,1}-x_{1,0}$, $\Delta x_{1,2}=x_{1,2}-x_{1,0}$, etc.). The Δx variables may be positive or negative depending on whether the adjusted value of the fault parameter is greater than or less than the target value. Each of the Δx variables may represent a change in the fault parameter from the baseline or target value under normal operating conditions (e.g., in the absence of a fault). Step 408 may be repeated for each of the fault parameters modulated in step 404 and used to estimate energy consumption values in step 406, generating a different set of Δx variables for each fault parameter.

Still referring to FIG. 4, process 400 is shown to include generating a second set of variables including multiple differences (i.e., Δy variables) between an amount of energy estimated by the energy consumption model with the fault parameter at the target value and one of the amounts of energy estimated by the energy consumption model with the fault parameter at one of the multiple different values (step 410). The set of variables may include multiple differences between the baseline energy consumption value $\hat{y}_0$ and one of the estimated energy consumption variables (e.g., $\Delta y_{i,1} = \hat{y}_{i,1} - \hat{y}_0$, $\Delta y_{i,2} = \hat{y}_{i,2} - \hat{y}_0$, $\Delta y_{i,3} = \hat{y}_{i,3} - \hat{y}_0$, etc.). The $\Delta y$ variables may be positive or negative depending on whether the estimated energy consumption value is greater than or less than the baseline value. Each of the $\Delta y$ variables may represent a change in the energy consumption attributable to a fault relative to the baseline energy consumption under normal operating conditions (e.g., in the absence of a fault). Step 410 may be repeated for each fault parameter $x_i$ (i.e., $x_1, \ldots x_m$) of the energy consumption model, generating a different set of $\Delta y$ variables for each fault parameter.

Still referring to FIG. 4, process 400 is shown to include using the first set of variables ($\Delta x$ variables) and the second set of variables ($\Delta y$ variables) to develop a regression model for the fault parameter (step 412). Step 412 may be performed by regression model module 80 as described with reference to FIG. 3C. In some embodiments, step 412 includes developing a univariate regression model having the form:

$$\Delta y = \beta_1 + \beta_2 \Delta x$$

where $\Delta y$ is the change in energy consumption from the baseline energy consumption (e.g., determined by energy consumption estimator module 78), $\Delta x$ is the change in the modulated parameter from the target value (e.g., determined by parameter modulation module 76), and $\beta_1$ and $\beta_2$ are regression coefficients. $\Delta y$ and $\beta_1$ may have units of energy per unit area (e.g., $J/m^2$) and $\beta_2$ may have units that depend on the units of $\Delta x$.

In some embodiments, step 412 includes developing a multivariate regression model having the form:

$$\Delta y = \beta_1 + \beta_2 \Delta x + \beta_3 OAX_{avg}$$

where $\Delta y$, $\Delta x$, $\beta_1$, and $\beta_2$ represent the same types of items as described with respect to the univariate case, $OAX_{avg}$ is a weather parameter (e.g., average temperature, relative humidity, enthalpy, etc.) and $\beta_3$ is regression coefficient. The multivariate model may be appropriate for implementations in which energy consumption is also weather dependent or where the change in energy consumption resulting from a fault varies with weather conditions.

In some embodiments, step 412 includes determining whether the change in energy consumption resulting from a particular fault is weather dependent. If the energy consumption resulting from the fault is not weather dependent, step 412 may include using the univariate model to model the change in energy consumption. However, if the energy consumption resulting from the fault is weather dependent, step 412 may include using the multivariate model to model the change in energy consumption.

Step 412 may include using any of a variety of different estimation techniques to estimate the values of the regression coefficients $\beta_1$, $\beta_2$, and $\beta_3$. In some embodiments, step 412 includes using a partial least squares regression (PLSR) method. In other embodiments, step 412 includes using other methods, such as ridge regression (RR), principal component regression (PCR), weighted least squares regression (WLSR), or ordinary least squares regression (OLSR).

The regression model developed for a model parameter in step 412 can be used to estimate a change in energy consumption resulting from a fault that affects the model parameter. Advantageously, the regression model allows for the change in energy consumption to be estimated at multiple degrees of the same fault. For example, if the model parameter deviates from the target value by a small amount $\Delta x_{1,a}$, the value of $\Delta x_{1,a}$ can be plugged into the regression model to determine a corresponding change in energy consumption $\Delta y_{1,a}$. If the model parameter deviates from the target value by a large amount $\Delta x_{1,b}$, the value of $\Delta x_{1,b}$ can be plugged into the same regression model to determine the corresponding change in energy consumption $\Delta y_{1,b}$. The regression models developed in step 412 may be stored in a data storage or memory device (e.g., memory 60) and subsequently retrieved to monetize and prioritize actual faults.

Still referring to FIG. 4, process 400 is shown to include determining a cost of a fault associated with the fault parameter using the regression model (step 414). Step 414 may be performed in an online environment to prioritize and monetize actual faults (e.g., faults detected by FDD module 70). For example, when a fault is detected, step 414 may include retrieving the regression model associated with the fault parameter from a data storage device in which the regression models are stored.

Step 414 may include identifying a $\Delta x$ value to use in the regression model by comparing the current value of the fault parameter with the target value for the fault parameter. Step 414 may include using the difference between the current value of the fault parameter and the target value of the fault parameter as the value of $\Delta x$ in the regression model.

If the regression model is a multivariate regression model, step 414 may include identifying a value of the $OAX_{avg}$ weather parameter. The $OAX_{avg}$ weather parameter may be stored in weather data module 64 and retrieved from weather data module 64 in step 414 for use in the regression model. Step 414 may include calculating a value for the change in energy consumption $\Delta y$ predicted by the regression model as a function of the $\Delta x$ value, the regression model coefficients, and, in some implementations, the weather parameter $OAX_{avg}$.

In some embodiments, the estimated change in energy consumption $\Delta y$ is expressed as an energy consumption per unit area (e.g., $J/m^2$). Step 414 may include multiplying the estimated change in energy consumption $\Delta y$ by an area of the building or an area of a portion of building that is affected by the fault (e.g., the area of one or more building zones or rooms) using one of the following equations:

$$\text{Energy} = \Delta y \cdot \text{Area} = (\beta_1 + \beta_2 \Delta x) \cdot \text{Area}$$

$$\text{Energy} = \Delta y \cdot \text{Area} = (\beta_1 + \beta_2 \Delta x + \beta_3 OAX_{avg}) \cdot \text{Area}$$

where the value of the variable "Energy" represents the increase in total energy consumption expected to result from the fault.

In some embodiments, step 414 includes using the estimated change in energy consumption to determine a monetary cost of a detected fault. Step 14 may include obtaining energy pricing information from smart grid 26 and/or energy providers and purchasers 44 to calculate the monetary cost of the increase in energy consumption. For example, step 414 may include multiplying the increase in energy consumption associated with the fault by the cost of energy. Step 414 may include determining a monetary cost of the fault due to an increase in energy consumption for a period of time (e.g., cost per day, cost per month, cost per year, etc.).

In some embodiments, step 414 includes using other types of cost information (e.g., replacement costs, service costs, etc.) in conjunction with the energy cost information to monetize a fault. For example, step 414 may include comparing the monetary cost of correcting a fault with the ongoing energy cost associated with the fault to determine whether it would be cost effective to correct a detected fault (e.g., if the monetary cost associated with a fault exceeds the repair cost) or whether correcting the fault would cost more than the increase in energy consumption attributable to the fault. Step 414 may be repeated to calculate an estimated change in energy consumption and/or monetary cost for each of the detected faults.

Still referring to FIG. 4, process 400 is shown to include using multiple different regression models to determine the costs of multiple faults (step 416). Each of the multiple different regression models may correspond to a different fault parameter. In some embodiments, step 416 includes repeating steps 404-414 to develop multiple different regression models (e.g., one regression model for each fault parameter). The multiple different regression models can be used to estimate the cost associated with multiple faults.

Still referring to FIG. 4, process 400 is shown to include prioritizing the multiple different faults based on the costs determined by the multiple different regression models (step 418). Step 418 may include using the energy cost information and/or repair cost information for each fault to determine a fault correction priority. For example, step 418 may include determining that faults that cause the greatest increase in energy consumption or monetary cost should be corrected first whereas faults that cause a relatively lesser increase in energy consumption can be corrected later.

In some embodiments, step 418 includes comparing the regression model coefficients $\beta_2$ for various regression models (i.e., the regression models developed for each fault parameter) to determine which faults have the highest priority. Since the regression model coefficient $\beta_2$ is multiplied by the change in the fault parameter $\Delta x$ in the regression model (i.e., $\Delta y = \beta_1 + \beta_2 \Delta x$), the magnitude of the $\beta_2$ coefficient may indicate which faults result in the greatest change in energy consumption. For example, a regression model having a relatively small $\beta_2$ coefficient may indicate that the corresponding fault parameter has a lesser impact on energy consumption than a fault parameter associated with a regression model that has a larger $\beta_2$ coefficient. In some embodiments, fault monetization module 82 is configured to prioritize faults corresponding to regression models that have larger $\beta_2$ coefficients over faults corresponding to regression models that have smaller $\beta_2$ coefficients.

Still referring to FIG. 4, process 400 is shown to include generating and outputting a fault correction recommendation based at least partially on the fault cost and/or the fault priority (step 420). The fault correction recommendation may be a report for supporting operational decisions or capital requests. The report may include the cost of allowing faults to persist, energy wasted due to each fault, the potential cost to fix each fault (e.g., based on a service schedule), or other overall metrics such as overall subsystem or building reliability (e.g., compared to a benchmark). The fault correction recommendation may include a ranking of various detected faults according to the fault priority determined in step 418, a recommendation of whether to correct a fault (e.g., based on whether correcting the fault would be cost effective), a recommendation of which faults should be corrected first, and/or a recommendation of how a fault may be corrected (e.g., by identifying the faulty equipment or component with specificity).

Step 420 may include generating an output for presentation to a user. For example, step 420 may include generating a graphical display, a visual display, a textual display, or any other type of user-comprehensible output. Step 420 may include communicating a result of a user query/request (e.g., a system status request, a request for an analytical report, etc.), a result of an intermediate processing step (e.g., a regression parameter or change in energy consumption value, etc.), a result of a performance analysis, a result of a fault detection analysis, or any other data stored or used in process 400. In various embodiments, step 420 may include generating display data for presentation via a local display (e.g., to a local user interacting with BMS controller 24 via user interface I/O 54), or communicating output data to a remote user via data communications interface 52 (e.g., a user interacting with BMS controller 24 via a network connection and/or a remote client).

Step 420 may include providing a visualization of one or more detected faults, root causes of the detected faults, the priority of various faults, the energy cost of detected faults, the monetary cost of detected faults, the repair cost of detected faults, and/or recommended actions for assessment or repair to a user via a GUI. An exemplary user interface which may be generated in step 420 is described in greater detail with reference to FIGS. 5-6. In some embodiments, step 420 includes storing such information in a data storage device and/or providing such information to a service management system or a work dispatch service for action.

In some embodiments, step 420 includes interacting with monitoring and reporting applications 48 to generate and present system status information to a user or diagnostic system. For example, step 420 may include generating and presenting real time system health dashboards that can be viewed and navigated by a user (e.g., a building engineer). Monitoring and reporting applications 48 used in step 420 may include a web-based monitoring application that includes several graphical user interface (GUI) elements (e.g., widgets, dashboard controls, windows, etc.) for displaying key performance indicators (KPI) or other information to users of a GUI. In addition, the GUI elements may summarize relative energy use and intensity across different buildings (real or modeled), different campuses, or the like. Other GUI elements or reports may be generated and shown based on available data that allow facility managers to assess performance across a group of buildings from one screen. The user interface or report (or underlying data engine) may be configured to prioritize and monetize faults, categorize faults by building, building type, equipment type, fault type, times of occurrence, frequency of occurrence, severity, and the like. The GUI elements may include charts or histograms that allow the user to visually analyze the magnitude of occurrence of specific faults or equipment for a building, time frame, or other grouping.

In some embodiments, step 420 includes conducting a priority-based suppression of faults (e.g., suppressed relative to a user interface, suppressed relative to further diagnostics, etc.). For example, step 420 may include suppressing faults that have a lower priority (e.g., lower estimated energy consumption, lower monetary value, lower $\beta_2$ parameter value, etc.) in favor of faults that have a higher priority.

Referring now to FIGS. 5-6 a graphical user interface (GUI) 500 is shown, according to an exemplary embodiment. GUI 500 may include one or more GUI elements (e.g., widgets, dashboard controls, windows, etc.) for displaying key performance indicators (KPI) or other information to users. GUI 500 may be generated by user interface/output module 74 (as described with reference to FIG. 3C) and/or in step 420 (as described with reference to FIG. 4) to provide a visualization of one or more detected faults and the costs associated therewith. GUI 500 may be provided to a local or remote user interface device to facilitate user interaction with BMS controller 24. For example, GUI 500 may display the outputs of fault detection and diagnostics module 70, energy consumption estimator module 78, fault monetization module 82, and/or other memory modules of BMS controller 24.

GUI 500 is shown to include a fault display portion 540. Fault display portion 540 may include a graphical representation of one or more faults detected by fault detection and diagnostics module 70. In various embodiments, fault display portion 540 may be a faults table (as shown in FIGS. 5-6), a chart, a graph, a list, or any other GUI element for displaying detected faults. For example, fault display portion 540 may be divided into multiple rows and multiple columns. In some embodiments, fault display portion 540 displays each fault in a separate row. Although fault display portion 540 is shown as a graphical table with faults separated by row, it should be understood that fault display portion 540 may have any of a variety of formats or configurations for displaying detected faults and information associated therewith.

In FIGS. 5-6, fault display portion 540 is shown to include a plurality of columns 502-513. Each column may intersect a plurality of rows and may provide details and/or information associated with the fault or faults in each intersecting row. For example, fault display portion 540 is shown to include a fault column 506. Fault column 506 may display a fault name, a fault type, a fault category, a fault description, and/or other details or information identifying a detected fault. Location column 502 may provide a location for each detected fault. Locations may be provided at any level of granularity. For example, the data in location column 502 may identify a particular building (e.g., "North Campus Corporate Building"), a particular floor or zone (e.g., "Floor 2," "Zone 8," etc.), a particular room (e.g., "Conference Room 23"), a geographic location, or any other indication of a location. Equipment column 504 may identify a particular device or equipment with which a fault is associated (e.g., "VAV 65," "Fancoil-2," etc.).

Referring particularly to FIG. 5, fault display portion 540 is shown to include a waste expense column 508. Waste expense column 508 may display a cost associated with the displayed faults (e.g., an energy cost, a monetary cost, etc.). In some embodiments, the data in waste expense column 508 is generated by fault monetization module 82 using the systems and methods described with reference to FIGS. 3A-4. For example, waste expense column 508 may display the output of various regression models (e.g., the regression models developed by regression model module 80) to provide an indication of the costs associated with each of the displayed faults. In some embodiments, waste expense column 508 displays the cost of allowing a fault to remain unchecked for a predefined time period (e.g., a week, a month, etc.). For example, waste expense column 508 may display the monthly cost of a fault.

Referring particularly to FIG. 6, fault display portion 540 is shown to include an inefficiency impact column 513. In some embodiments, inefficiency impact column 513 may display the same or similar information as waste expense column 508. For example, inefficiency impact column 513 may display a monetary or energy cost associated with a fault. In some embodiments, inefficiency impact column 513 may display a textual message for faults having a cost less than a threshold value. For example, inefficiency impact column 513 may display "Minimal Impact" if the monetary cost of a fault is less than a threshold value.

In some embodiments, fault display portion 540 includes a savings opportunity column 510. Savings opportunity column 510 may provide an indication of an amount (e.g., a monetary amount, an energy amount, etc.) that could be saved if the corresponding fault is repaired. Savings opportunity column 510 may display savings as an amount per unit time (e.g., a yearly savings, a savings over the expected life of the corresponding equipment, etc.).

In some embodiments, fault display portion 540 includes an importance column 512. Importance column 512 may display a message indicating the relative importance of a fault. Importance may be based on one or more factors including, for example, energy cost, monetary cost, equipment function, fault magnitude, the effect of the fault on occupancy conditions, deviation of a control variable from an acceptable range, or other factors having an impact on the importance of the fault. Importance column 512 may label faults with various degrees of importance (e.g., "Minimal," "Low," "Medium," "High," "Critical," etc.)

Still referring to FIGS. 5-6, GUI 500 is shown to include interactive controls for interacting with GUI 500 and changing the information displayed on GUI 500. For example, GUI 500 is shown to include a plurality of sort arrows in the headings of columns 502-513. The sort arrows in a particular column heading may be used to sort the faults displayed in fault portion 540 according to the values in the corresponding column. For example, a user may click the arrows in the heading of importance column 512 to sort fault display portion 540 by the importance value of each fault (e.g., from least important to most important, from most important to least important, etc.). Refresh button 528 may be used to update (i.e., refresh) the faults displayed in fault display portion 540.

In some embodiments, GUI 500 may include one or more filter buttons 514-526. Filter buttons 514-526 may be used to filter the faults displayed in fault display portion 540 according to various filtering criteria. For example, location filter button 514 may be used to filter faults according to the value of the location attribute displayed in location column 502 (e.g., excluding faults associated with a particular location, displaying only faults associated with a particular location, etc.). Equipment filter button 516 may be used to filter the displayed faults by equipment type. Fault type filter button 518 may be used to filter the displayed faults by fault type. Peer group filter button 520 may be used to filter the displayed faults by peer group. Importance filter button 522 may be used to filter the displayed faults by importance (e.g., showing only high importance faults, excluding minimal importance faults, etc.). Date range filter button 524 may be used to filter the displayed faults by date range (e.g., displaying only faults occurring within a particular time window). Saved filters button 526 may be used to save and/or select a particular filter configuration.

Advantageously, GUI 500 may be used to readily determine the priority of various faults detected using the systems and methods of the present disclosure. A user can interact with GUI 500 to determine which faults are most important (e.g., by sorting faults by the importance attribute), to determine which faults have the highest cost (e.g., by sorting faults by waste expense or savings opportunity), and to view other information and/or details associated with each of the detected faults. Using the information provided via GUI 500, a user (or an automated system) can determine a fault correction priority.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them.

Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific embodiment details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product embodied on a tangible medium or packaged into multiple such software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A method for monetizing faults in a building, the method comprising:
    operating building equipment to affect a variable state or condition within the building by interacting with a physical environment of the building, wherein operating the building equipment affects an amount of energy consumed by the building;
    evaluating, at a processing circuit, an energy consumption model for the building to estimate the amount of energy consumed by the building as a function of a plurality of parameters;
    modulating, by the processing circuit, a fault parameter of the energy consumption model and using the energy consumption model to estimate the amount of energy consumed by the building at multiple different values of the fault parameter;
    generating, by the processing circuit, a first set of variables comprising multiple first differences in the fault parameter, each of the multiple first differences generated by calculating a difference between a target value of the fault parameter and one of the multiple different values of the fault parameter;
    generating, by the processing circuit, a second set of variables comprising multiple second differences in the amount of energy estimated by the energy consumption model, each of the multiple second differences generated by calculating a difference between the amount of energy estimated by the energy consumption model with the fault parameter at the target value and one of the amounts of energy estimated by the energy consumption model with the fault parameter at one of the multiple different values;
    using the first set of variables and the second set of variables to develop, by the processing circuit, a regression model for the fault parameter, the regression model different than the energy consumption model and estimating a change in the amount of energy consumed by the building as a direct function of a change in the fault parameter;
    detecting, by the processing circuit, a fault associated with the fault parameter;
    in response to detecting the fault, initiating, by the processing circuit, expanded data logging related to the fault to collect additional data indicating a current value of the fault parameter; and
    determining, by the processing circuit, a cost of the fault associated with the fault parameter using the regression model and the current value of the fault parameter.

2. The method of claim 1, further comprising:
    repeating the 'modulating,' first 'generating,' second 'generating,' and 'using' steps for a plurality of different fault parameters of the energy consumption model to develop a plurality of regression models, each of the plurality of regression models estimating a change in the amount of energy consumed by the building as a function of a change in a different fault parameter of the energy consumption model.

3. The method of claim 1, further comprising:
    detecting multiple faults at the processing circuit, each of the multiple faults corresponding to a different fault parameter of the energy consumption model; and
    using multiple different regression models to determine a cost associated with each of the multiple faults, wherein each of the multiple different regression models is developed for one of the different fault parameters of the energy consumption model.

4. The method of claim 3, further comprising:
    prioritizing the multiple faults based on the cost associated with each of the multiple faults.

5. The method of claim 1, wherein determining the cost of the fault associated with the fault parameter using the regression model comprises:
    determining a difference between the current value of the fault parameter and the target value of the fault parameter;
    applying the difference between the current value of the fault parameter and the target value of the fault parameter as an input to the regression model developed for the fault parameter; and
    using the regression model to estimate a change in energy consumption resulting from the difference in the fault parameter.

6. The method of claim 1, further comprising:
    determining a cost of correcting the fault;
    comparing the cost of the fault with the cost of correcting the fault; and
    displaying or storing an indication of whether it would be cost effective to correct the fault based on a result of the comparison.

7. The method of claim 1, further comprising:
displaying or storing a fault correction priority based at least partially on the cost of the fault, wherein the fault correction priority includes at least one of:
a priority of correcting the fault relative to other faults,
an indication of whether it would be cost effective to correct the fault, and
an indication of whether the cost of the fault exceeds a cost threshold.

8. The method of claim 1, wherein the regression model estimates a cost of the fault per unit area, the method further comprising:
identifying an area of the building affected by the fault; and
calculating an energy cost of the fault by multiplying an estimated energy cost per unit area by the area of the building affected by the fault.

9. The method of claim 1, wherein determining the cost of the fault using the regression model comprises:
estimating an energy cost of the fault using the regression model; and
determining a monetary cost of the fault by multiplying the energy cost of the fault by a price per unit energy.

10. The method of claim 1, wherein the regression model is a univariate regression model comprising:
one or more regression model coefficients; and
a variable corresponding to the difference between the target value of the fault parameter and one of the multiple different values of the fault parameter.

11. The method of claim 1, wherein the regression model is a multivariate regression model comprising:
a plurality of regression model coefficients;
a variable corresponding to the difference between the target value of the fault parameter and one of the multiple different values of the fault parameter; and
one or more predictor variables comprising at least one of a variable dependent on a weather condition or a variable dependent on a building condition.

12. The method of claim 1, wherein the target value of the fault parameter corresponds to a value of the fault parameter in an absence of a fault; and
wherein modulating the fault parameter comprises modulating the fault parameter while maintaining other parameters of the energy consumption model at fixed values.

13. A system for monetizing faults in a building, the system comprising:
building equipment operable to affect a variable state or condition within the building by interacting with a physical environment of the building, wherein operating the building equipment affects an amount of energy consumed by the building; and
a processing circuit configured to:
use an energy consumption model for the building to estimate the amount of energy consumed by the building as a function of a plurality of parameters;
modulate a fault parameter of the energy consumption model and use the energy consumption model to estimate the amount of energy consumed by the building at multiple different values of the fault parameter;
generate a first set of variables comprising multiple first differences in the fault parameter, each of the multiple first differences generated by calculating a difference between a target value of the fault parameter and one of the multiple different values of the fault parameter;
generate a second set of variables comprising multiple second differences in the amount of energy estimated by the energy consumption model, each of the multiple second differences generated by calculating a difference between the amount of energy estimated by the energy consumption model with the fault parameter at the target value and one of the amounts of energy estimated by the energy consumption model with the fault parameter at one of the multiple different values;
use the first set of variables and the second set of variables to develop a regression model for the fault parameter, the regression model different than the energy consumption model and estimating a change in the amount of energy consumed by the building as a direct function of a change in the fault parameter;
detect a fault associated with the fault parameter;
in response to detecting the fault, initiate expanded data logging related to the fault to collect additional data indicating a current value of the fault parameter; and
determine a cost of the fault associated with the fault parameter using the regression model and the current value of the fault parameter.

14. The system of claim 13, wherein the processing circuit is configured to develop a plurality of regression models, each of the plurality of regression models estimating a change in the amount of energy consumed by the building as a function of a change in a different fault parameter of the energy consumption model.

15. The system of claim 13, wherein the processing circuit is configured to:
detect multiple faults, each of the multiple faults corresponding to a different fault parameter of the energy consumption model;
use multiple different regression models to determine a cost associated with each of the multiple faults, wherein each of the multiple different regression models is developed for one of the different fault parameters of the energy consumption model; and
prioritize the multiple faults based on the cost associated with each of the multiple faults.

16. The system of claim 13, wherein determining the cost of the fault associated with the fault parameter using the regression model comprises:
determining a difference between the current value of the fault parameter and the target value of the fault parameter;
applying the difference between the current value of the fault parameter and the target value of the fault parameter as an input to the regression model developed for the fault parameter; and
using the regression model to estimate a change in energy consumption resulting from the difference in the fault parameter.

17. The system of claim 13, wherein the processing circuit is configured to output a fault correction priority based at least partially on the cost of the fault, wherein the fault correction priority includes at least one of:
a priority of correcting the fault relative to other faults,
an indication of whether it would be cost effective to correct the fault, and
an indication of whether the cost of the fault exceeds a cost threshold.

18. The system of claim 13, wherein the regression model is at least one of a univariate regression model and a multivariate regression model;

wherein the univariate regression model comprises one or more regression model coefficients, and a variable corresponding to the difference between the target value of the fault parameter and one of the multiple different values of the fault parameter; and wherein the multivariate regression model comprises a plurality of regression model coefficients, a variable corresponding to the difference between the target value of the fault parameter and one of the multiple different values of the fault parameter, and a variable dependent on a weather condition.

19. A system for prioritizing faults in a building, the system comprising:

building equipment operable to affect a variable state or condition within the building by interacting with a physical environment of the building, wherein operating the building equipment affects an amount of energy consumed by the building; and a processing circuit configured to:

modulate a fault parameter of an energy consumption model and use the energy consumption model to estimate the amount of energy consumed by the building at multiple different values of the fault parameter;

generate a first set of variables comprising multiple first differences in the fault parameter, each of the multiple first differences generated by calculating a difference between a target value of the fault parameter and one of the multiple different values of the fault parameter;

generate a second set of variables comprising multiple second differences in the amount of energy estimated by the energy consumption model, each of the multiple second differences generated by calculating a difference between the amount of energy estimated by the energy consumption model with the fault parameter at the target value and one of the amounts of energy estimated by the energy consumption model with the fault parameter at one of the multiple different values;

use the first set of variables and the second set of variables to develop an energy cost regression model for the fault parameter, the energy cost regression model different than the energy consumption model and estimating a change in the amount of energy consumed by the building as a direct function of a change in the fault parameter;

detect a fault associated with the fault parameter;

in response to detecting the fault, initiate expanded data logging related to the fault to collect additional data indicating a current value of the fault parameter; and determine a cost of the fault associated with the fault parameter using the energy cost regression model developed for the fault parameter and the current value of the fault parameter.

20. The system of claim 19, wherein the processing circuit is configured to determine multiple different costs associated with multiple different degrees of the fault using the energy cost regression model developed for the fault parameter, each of the multiple different degrees of fault corresponding to a different change in the fault parameter.

21. The system of claim 19, wherein the processing circuit is configured to:

detect multiple faults, each of the multiple faults corresponding to a different fault parameter of the energy consumption model;

develop and use multiple different energy cost regression models to determine a cost associated with each of the multiple faults, wherein each of the multiple different energy cost regression models is developed for one of the different fault parameters of the energy consumption model; and prioritize the multiple faults based on the cost associated with each of the multiple faults.

* * * * *